US008266603B2

(12) United States Patent
Inagaki et al.

(10) Patent No.: US 8,266,603 B2
(45) Date of Patent: Sep. 11, 2012

(54) TECHNIQUE FOR ALLOCATING REGISTER TO VARIABLE FOR COMPILING

(75) Inventors: Tatsushi Inagaki, Yokohama (JP); Hideaki Komatsu, Yokohama (JP); Takuya Nakaike, Yokohama (JP); Rei Odaira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 12/133,349

(22) Filed: Jun. 4, 2008

(65) Prior Publication Data

US 2009/0064112 A1    Mar. 5, 2009

(30) Foreign Application Priority Data

Aug. 29, 2007   (JP) ................................. 2007-223143

(51) Int. Cl.
*G06F 9/45*    (2006.01)
(52) U.S. Cl. ......... 717/140; 717/141; 717/143; 717/151
(58) Field of Classification Search .................... 717/140
See application file for complete search history.

(56) References Cited

U.S. PATENT DOCUMENTS

| | | | | |
|---|---|---|---|---|
| 5,784,066 A * | 7/1998 | Aizikowitz et al. | ........... | 345/440 |
| 5,842,021 A * | 11/1998 | Odani et al. | .................... | 717/151 |
| 5,881,288 A * | 3/1999 | Sumi et al. | ..................... | 717/125 |
| 6,170,998 B1 * | 1/2001 | Yamamoto et al. | ........... | 717/140 |
| 6,421,824 B1 * | 7/2002 | Click et al. | ..................... | 717/140 |
| 6,898,787 B2 * | 5/2005 | Thompson et al. | ........... | 717/151 |
| 7,010,787 B2 * | 3/2006 | Sakai | ............................ | 717/141 |
| 7,174,546 B2 * | 2/2007 | Koseki et al. | ................. | 717/143 |
| 7,305,665 B2 * | 12/2007 | Koseki et al. | ................. | 717/140 |
| 7,386,843 B2 * | 6/2008 | Tarditi | .......................... | 717/151 |
| 2004/0015919 A1 * | 1/2004 | Thompson et al. | ........... | 717/151 |
| 2004/0103410 A1 * | 5/2004 | Sakai | ............................ | 717/140 |
| 2004/0194071 A1 * | 9/2004 | Tanaka | ......................... | 717/141 |
| 2004/0226005 A1 * | 11/2004 | Tarditi | .......................... | 717/151 |
| 2006/0005194 A1 * | 1/2006 | Kawahara et al. | ............ | 718/100 |
| 2008/0134151 A1 * | 6/2008 | Koseki et al. | ................. | 717/140 |
| 2008/0229066 A1 * | 9/2008 | Gschwind | ..................... | 712/204 |

OTHER PUBLICATIONS

Ben L. Titzer, Improving Compiler-Runtime Separation with XIR, 2010, ACM, p. 1-12 <URL:http://delivery.acm.org/10.1145/1740000/1736005/p39-titzer.pdf>.*

(Continued)

*Primary Examiner* — Thuy Dao
*Assistant Examiner* — Hua Lu
(74) *Attorney, Agent, or Firm* — Vazken Alexanian

(57) ABSTRACT

The present invention relates to allocating registers to variables in order to compile a program. In an embodiment of the present invention a compiler apparatus stores interference information indicating an interference relationship between variables, selects a register and allocates the register to each variables in accordance with a predetermined procedure, without allocating the same register to a set of variables having interference relationships. The compiler further replaces multiple variables having the same register allocated thereto with a new variable and generates an interference relationship by merging the interference relationships each concerning one of multiple variables. The compiler further updates interference information according to the generated interference relationship and allocates to each variable in the program using the new variable a register, selected in accordance with the predetermined procedure without allocating the same register to a set of variables having the interference relationships, based on the updated interference information.

13 Claims, 23 Drawing Sheets

OTHER PUBLICATIONS

Matthias Kuehnle, An approach for power and performance evaluation of Reconfigurable SoC at mixed abstraction levels, IEEE, 2011, p. 1-9 <URL: http://ieeexplore.ieee.org/xpls/abs_all.jsp>.*

Wilson C. Hsieh, C and tcc: A Language and Compiler for Dynamic Code Generation, 1999, ACM, p. 1-8 <URL:http://delivery.acm.org/10.1145/320000/316697/p324-poletto.pdf>.*

Xiaotong Zhuang, Differential Register Allocation, ACM, 2005, p. 1-6 <URL:http://delivery.acm.org/10.1145/1070000/1065031/p168-zhuang.pdf>.*

William R. Mark and Kekoa Proudfoot, Compiling to a VLIW Fragment Pipeline, ACM, 2001, p. 1-8 <URL:http://delivery.acm.org/10.1145/390000/383526/p47-mark.pdf>.*

David Ryan Koes, Register Allocation Deconstructed, ACM, 2009, p. 1-8 <URL:http://delivery.acm.org/10.1145/1550000/1543824/p21-koes.pdf>.*

Appel et. al., "Iterated Register Coalescing," ACM Transactions on Programming Languages and Systems, pp. 300-324, vol. 18, No. 3, May 1996.

Briggs et. al., "Improvements to Graph Coloring Register Allocation," ACM Transactions on Programming Languages and System, pp. 428-455, vol. 16, No. 3, May 1994.

P. Briggs, "Register Allocation via Graph Coloring," PhD. thesis, Rice University, 1992.

G. J. Chaitin, "Register Allocation & Spilling via Graph Coloring," ACM SIGPLAN Notices, pp. 98-105, vol. 17, No. 6, Apr. 1982.

Moon et. al., "Optimistic Register Coalescing," ACM Transactions on Programming Languages and Systems, pp. 735-765, vol. 26, No. 4, Jul. 2004.

\* cited by examiner

| | a1 | a2 | a3 | a4 | b1 | b2 | b3 | b4 | b5 | c1 | c2 | c3 | c4 |
|---|---|---|---|---|---|---|---|---|---|---|---|---|---|
| a1 | 0 | 1 | 0 | 0 | 0 | 0 | 0 | 0 | 0 | 0 | 0 | 0 | 0 |
| a2 | 1 | 0 | 1 | 0 | 0 | 0 | 0 | 0 | 0 | 0 | 0 | 0 | 0 |
| a3 | 0 | 1 | 0 | 1 | 0 | 0 | 0 | 0 | 0 | 0 | 0 | 0 | 0 |
| a4 | 0 | 0 | 1 | 0 | 0 | 0 | 0 | 0 | 0 | 0 | 0 | 0 | 0 |
| b1 | 0 | 0 | 0 | 0 | 0 | 1 | 0 | 0 | 0 | 0 | 0 | 0 | 0 |
| b2 | 0 | 0 | 0 | 0 | 1 | 0 | 1 | 0 | 0 | 0 | 0 | 0 | 0 |
| b3 | 0 | 0 | 0 | 0 | 0 | 1 | 0 | 1 | 0 | 0 | 0 | 0 | 0 |
| b4 | 0 | 0 | 0 | 0 | 0 | 0 | 1 | 0 | 1 | 0 | 0 | 0 | 0 |
| b5 | 0 | 0 | 0 | 0 | 0 | 0 | 0 | 1 | 0 | 0 | 0 | 0 | 0 |
| c1 | 0 | 0 | 0 | 0 | 0 | 0 | 0 | 0 | 0 | 0 | 1 | 0 | 0 |
| c2 | 0 | 0 | 0 | 0 | 0 | 0 | 0 | 0 | 0 | 1 | 0 | 1 | 0 |
| c3 | 0 | 0 | 0 | 0 | 0 | 0 | 0 | 0 | 0 | 0 | 1 | 0 | 1 |
| c4 | 0 | 0 | 0 | 0 | 0 | 0 | 0 | 0 | 0 | 0 | 0 | 1 | 0 |

65A

| VARIABLE | GAIN (X) | ORDER (Y) | COST (X/Y) |
|---|---|---|---|
| a1 | 1 | 0 | ∞ |
| a2 | 1 | 9 | 0.11 |
| a3 | 1 | 2 | 0.50 |
| a4 | 1 | 2 | 0.50 |
| b1 | 1 | 1 | 1.00 |
| b2 | 1 | 1 | 1.00 |
| b3 | 1 | 2 | 0.50 |
| b4 | 1 | 2 | 0.50 |
| b5 | 1 | 6 | 0.17 |
| c1 | 1 | 4 | 0.25 |
| c2 | 1 | 2 | 0.50 |
| c3 | 1 | 2 | 0.50 |
| c4 | 1 | 4 | 0.25 |

|  | a1 | a2 | a3' | b1' | b5 | c1' | c4 |
|---|---|---|---|---|---|---|---|
| a1 | 0 | 1 | 0 | 0 | 0 | 0 | 0 |
| a2 | 1 | 0 | 1 | 0 | 0 | 0 | 0 |
| a3' | 0 | 1 | 0 | 0 | 0 | 0 | 0 |
| b1' | 0 | 0 | 0 | 0 | 1 | 0 | 0 |
| b5 | 0 | 0 | 0 | 1 | 0 | 0 | 0 |
| c1' | 0 | 0 | 0 | 0 | 0 | 0 | 1 |
| c4 | 0 | 0 | 0 | 0 | 0 | 1 | 0 |

65B

| VARIABLE | GAIN (X) | ORDER (Y) | COST (X/Y) |
|---|---|---|---|
| a1 | 1 | 0 | ∞ |
| a2 | 1 | 4 | 0.25 |
| a3' | 2 | 2 | 1.00 |
| b1' | 4 | 2 | 2.00 |
| b5 | 1 | 4 | 0.25 |
| c1' | 3 | 3 | 1.00 |
| c4 | 1 | 3 | 0.33 |

S1735

S1735

(a)

(b)

S1740

| VARIABLE | GAIN (X) | ORDER (Y) | COST (X/Y) |
|---|---|---|---|
| p | 2 | 3 | 0.6666 |
| q | 2 | 3 | 0.6666 |
| r | 2 | 3 | 0.6666 |
| s | 1 | 3 | 0.3333 |

(c) 
STACK (a)

(b)

S1762

| VARIABLE | GAIN (X) | ORDER (Y) | COST (X/Y) |
|---|---|---|---|
| p | 2 | 2 | 1 |
| q | 2 | 2 | 1 |
| r | 2 | 2 | 1 |
| s | 1 | 3 | 0.3333 |

(c) 
STACK

S1762

(a)

(b)

| VARIABLE | GAIN (X) | ORDER (Y) | COST (X/Y) |
|---|---|---|---|
| p | 2 | 2 | 1 |
| q | 2 | 2 | 1 |
| r | 2 | 2 | 1 |
| ( s ) | ( 1 ) | ( 3 ) | (0.3333) |

(c)

STACK

S1765

(a)

(b)

| VARIABLE | GAIN (X) | ORDER (Y) | COST (X/Y) |
|---|---|---|---|
| p | 2 | 2 | 1 |
| q | 2 | 2 | 1 |
| r | 2 | 2 | 1 |
| s | 1 | 3 | 0.3333 |

(c)

STACK

TECHNIQUE FOR ALLOCATING REGISTER TO VARIABLE FOR COMPILING

CROSS-REFERENCE TO RELATED APPLICATIONS

This application claims priority under 35 U.S.C. §119 to Japanese Patent Application No. 2007-223143 filed Aug. 29, 2007, the entire contents of which is incorporated herein by reference.

FIELD OF THE INVENTION

The present invention relates to compiling of a program. In particular, the present invention relates to a technique for allocating registers to variables in order to compile a program.

BACKGROUND OF THE INVENTION

A compiler enhances the execution efficiency of a program by causing registers to hold values of variables used in the program. A technique for allowing a compiler to determine which register to hold each of variables is referred to as register allocation. If a certain register is caused to consistently hold a certain variable used in a program through the register allocation, the register is occupied by the variable even during the execution of a part of the program not using the variable frequently. As a result, this register cannot be used for another purpose, so that the execution efficiency of the program is sometimes decreased as a whole.

To solve this problem, a compiler may split a variable in a program into new multiple variables respectively corresponding to parts of the program, for example. Then, the complier selectively determines whether or not a register is allocated to each of the multiple variables. Thereby, the register can be used for another purpose even during the execution of a part of the program not using the variable frequently, and this enhances the execution efficiency of the program. On the other hand, when the variable is split into the new multiple variables, it is necessary to perform a process of assigning the value from one to a subsequent one of the new multiple variables. If this assigning process needs to be performed too many times, the execution efficiency of the program is decreased. For this reason, it is preferable to split a variable to an appropriate extent in order to enhance the execution efficiency of the program as a whole.

In order to split a variable to an appropriate extent, one may come up with an idea of applying a technique of merging nodes in a graph with each variable expressed as a node and with each interference relationship between variables expressed as an edge. However, use of known techniques described results in insufficient coalescing, so that too many assignment instructions are generated in some cases. In addition, use of known techniques described results in excessive coalescing and accordingly fails to produce a sufficient degree of effect of splitting variables.

"Register Allocation Via Graph Coloring," discloses a series of improvements and extensions to the first built global register allocator based on graph coloring built by Chaitin. The thesis discloses four primary results: (1) Optimistic coloring: The first built global register allocator assumes any node of high degree will not be colored and must therefore be spilled. By optimistically assuming that nodes of high degree will receive colors, lower spill costs and faster code are often achieved; (2) Coloring pairs: The pessimism of the first built global register allocator coloring heuristic is emphasized when trying to color register pairs. The thesis discloses pairs as a natural consequence of its optimism; (3) Rematerialization: The first built global register allocator introduced the idea of rematerialization to avoid the expense of spilling and reloading certain simple values. By propagating rematerialization information around the SSA graph using a simple variation of Wegman and Zadeck's constant propagation techniques, the thesis discovers and isolates a larger class of such simple values; (4) Live range splitting: Chow and Hennessy's technique, priority-based coloring, includes a form of live range splitting. By aggressively splitting live ranges at selected points before coloring, the thesis disclosure is able to incorporate live range splitting into the framework of the first built global register allocator. The thesis discloses the results of experimental studies measuring the effectiveness of each of the disclosures improvements. The thesis further discloses the results of an experiment suggesting that priority-based coloring requires $O(\$n\backslash sp2\$)$ time and that the Yorktown allocator requires only $O(n \log n)$ time. The thesis disclosure includes a chapter describing many implementation details and including further measurements designed to provide an accurate intuition about the time and space requirements of coloring allocators.

"Register Allocation & Spilling Via Graph Coloring," discloses how to extend the use of graph coloring techniques for doing global register allocation in a PL/I optimizing compiler. When the compiler cannot color the register conflict graph with a number of colors equal to the number of available machine registers, it must add code to spill and reload registers to and from storage. Previously the compiler produced spill code whose quality sometimes left much to be desired, and the ad hoc techniques used took considerable amounts of compile time so that it naturally solves the spilling problem. The thesis discloses how spill decisions are made on the basis of the register conflict graph and cost estimates of the value of keeping the result of a computation in a register rather than in storage. The thesis discloses that the new approach produces better object code and takes much less compile time.

"Iterated Register Coalescing," disclose that an important function of any register allocator is to target registers so as to eliminate copy instructions. The thesis discloses that a graph-coloring register allocation is an elegant approach to this problem. The thesis discloses that If the source and destination of a move instruction do not interfere, then their nodes can be coalesced in the interference graph. The thesis discloses that Chaitin's coalescing heuristic could make a graph uncolorable (i.e., introduce spills), Briggs et al. demonstrated a conservative coalescing heuristic that preserves colorability. The thesis discloses that Brigg's algorithm is too conservative and leaves too many move instructions in our programs. The thesis discloses that it has discovered how to interleave coloring reductions with Brigg's coalescing heuristic, leading to an algorithm that is safe but much more aggressive.

"Improvements to Graph Coloring Register Allocation," discloses that the thesis describes two improvements to Chaitin-style graph coloring register allocators. The thesis discloses that the first, optimistic coloring, uses a stronger heuristic to find a k-coloring for the interference graph. The thesis discloses that the second extends Chaitin's treatment of rematerialization to handle a larger class of values and that these techniques are complementary. The thesis discloses that optimistic coloring decreases the number of procedures that require spill code and reduces the amount of spill code when spilhng is unavoidable and that rematerialization lowers the cost of spilhng some values. The thesis discloses that: both of the techniques and the experience building and using register allocators that incorporate them; provides a detailed description of optimistic coloring and rematerialization; presents experimental data to show the performance of several versions of the register allocator on a suite of FORTRAN programs; and discusses several insights that we discovered only after repeated implementation of these allocators.

"Optimistic Register Coalescing," discloses that graph-coloring register allocators eliminate copies by coalescing the source and target nodes of a copy if they do not interfere in the interference graph. The thesis discloses that coalescing can be harmful to the colorability of the graph because it tends to yield a graph with nodes of higher degrees. The thesis discloses that unlike aggressive coalescing, which coalesces any pair of noninterfering copy-related nodes, conservative coalescing or iterated coalescing perform safe coalescing that preserves the colorability. The thesis discloses that these heuristics give up coalescing too early, losing many opportunities for coalescing that would turn out to be safe. The thesis further discloses that they ignore the fact that coalescing may even improve the colorability of the graph by reducing the degree of neighbor nodes that are interfering with both the source and target nodes being coalesced. The thesis proposes a new heuristic called optimistic coalescing which optimistically performs aggressive coalescing, thus exploiting the positive impact of coalescing aggressively, but when a coalesced node is to be spilled, it is split back into separate nodes. The thesis discloses that since there is a better chance of coloring one of those splits, the disclosure can reduce the overall spill amount.

Against this background, an object of the present invention is to provide a compiler apparatus and a compiling method and program capable of solving the foregoing problems. This object can be achieved by using a combination of features described in the independent claims in the scope of claims. In addition, the dependent claims define more advantageous specific examples of the present invention.

SUMMARY OF THE INVENTION

The illustrative embodiments of the present invention described herein provide a method, apparatus, and computer usable program product for detecting the order of wagons in a train. The embodiments described herein further provide if and how the order of wagons in a freight train is changed in a reliable manner.

An exemplary feature of an embodiment of the present invention is a compiler apparatus that allocates registers to variables used in a program to be compiled, which consists of a storage device that stores interference information indicating whether or not a certain variable and another variable used in the program have an interference relationship in which the variables concurrently hold effective values at any time point during an execution of the program, and assignment information in which a variable of an assignment source of an assignment instruction in the program is associated with a variable of an assignment destination of the assignment instruction. The compiler apparatus further consists of a first allocation section that selects a register from among a predetermined base number of or more registers, and allocates the selected register to each variable used in the program, in accordance with a predetermined procedure, without allocating the register to a set of variables having the interference relationship. The compiler apparatus further consists of an update section that replaces a plurality of the variables with a new variable on condition that the plurality of variables have the same the register allocated thereto by the first allocation section and are associated with each other in the assignment information, reads from a memory device the interference relationship concerning each of the plurality of variables, merges the read interference relationships to generate an new interference relationship concerning the new variable, and updates the interference information according to the generated new interference relationship. The compiler apparatus further consists of a second allocation section that selects a second register from among the base number of registers, and allocates the selected second register to each variable used in the program using the new variable instead of the plurality of variables, in accordance with the procedure of the first allocation section, without allocating the same register to a set of variables having the interference relationship based on the updated interference information. The compiler apparatus further consists of a output section that outputs the program having the registers allocated to each the variable used by the second allocation section.

Another exemplary feature of an embodiment of the present invention is a compiling method for causing a computer to allocate registers to variables used in a program to be compiled, wherein the computer includes a storage device that stores interference information indicating whether or not a certain variable and another variable used in the program have an interference relationship in which these variables concurrently hold effective values at any time point during execution of the program, and assignment information in which a variable of an assignment source of an assignment instruction in the program is associated with a variable of an assignment destination of the assignment instruction, the method consists of a first allocating step of selecting a register from among a predetermined base number of one or more registers and allocating the selected register to each variable used in the program, in accordance with a predetermined procedure, without allocating same the register to a set of variables having the interference relationship. The compiling method further consists of a step of replacing a plurality of aforementioned variables with a new variable on condition that the plurality of variables have same the register allocated thereto in the first allocating step and are associated with each other in the assignment information, reading from the memory device the interference relationship concerning each of the plurality of variables, merging the read interference relationships to generate an interference relationship concerning the new variable, and updating the interference information according to the generated interference relationship. The compiling method further consists of a second allocating step of selecting a register from among the base number of registers, and allocating the selected register to each variable used in the program using the new variable instead of the plurality of variables, in accordance with same the predetermined procedure as that in the first allocating step, without allocating same the register to a set of variables having the interference relationship based on the updated interference information. The compiling method further consists of a step of outputting the program having the registers allocated to the variables in the second allocating step.

Another exemplary feature of an embodiment of the present invention is a computer program product comprising a computer useable medium including a computer readable program, wherein the computer readable program when executed on a computer causes the computer to perform the method steps for a compiling method for causing a computer to allocate registers to variables used in a program to be compiled, wherein the computer includes a storage device that stores interference information indicating whether or not a certain variable and another variable used in the program have an interference relationship in which these variables concurrently hold effective values at any time point during execution of the program, and assignment information in which a variable of an assignment source of an assignment instruction in the program is associated with a variable of an assignment destination of the assignment instruction. The method consists of a first allocating step of selecting a register from among a predetermined base number of one or more registers and allocating the selected register to each variable used in the program, in accordance with a predetermined procedure, without allocating same the register to a set of variables having the interference relationship. The compiling method further consists of a step of replacing a plurality of aforementioned variables with a new variable on condition that the plurality of variables have same the register allocated thereto in the first allocating step and are associated with each other in the assignment information, reading from the memory device the interference relationship concerning each of the plurality of variables, merging the read interference relationships to generate an interference relationship concerning the new variable, and updating the interference information according to the generated interference relationship. The compiling method further consists of a second allocating step of selecting a register from among the base number of registers, and allocating the selected register to each variable used in the program using the new variable instead of the plurality of variables, in accordance with same the predetermined procedure as that in the first allocating step, without allocating same the register to a set of variables having the interference relationship based on the updated interference information. The compiling method further consists of a step of outputting the program having the registers allocated to the variables in the second allocating step.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The figures form a part of the specification and are used to describe the embodiments of the invention and explain the principle of the invention together with the literal statement. The foregoing and other objects, aspects, and advantages will be better understood from the following non-limiting detailed description of preferred embodiments of the invention with reference to the drawings, wherein.

DETAILED DESCRIPTION OF THE PREFERRED EMBODIMENTS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings.

Figure 1:
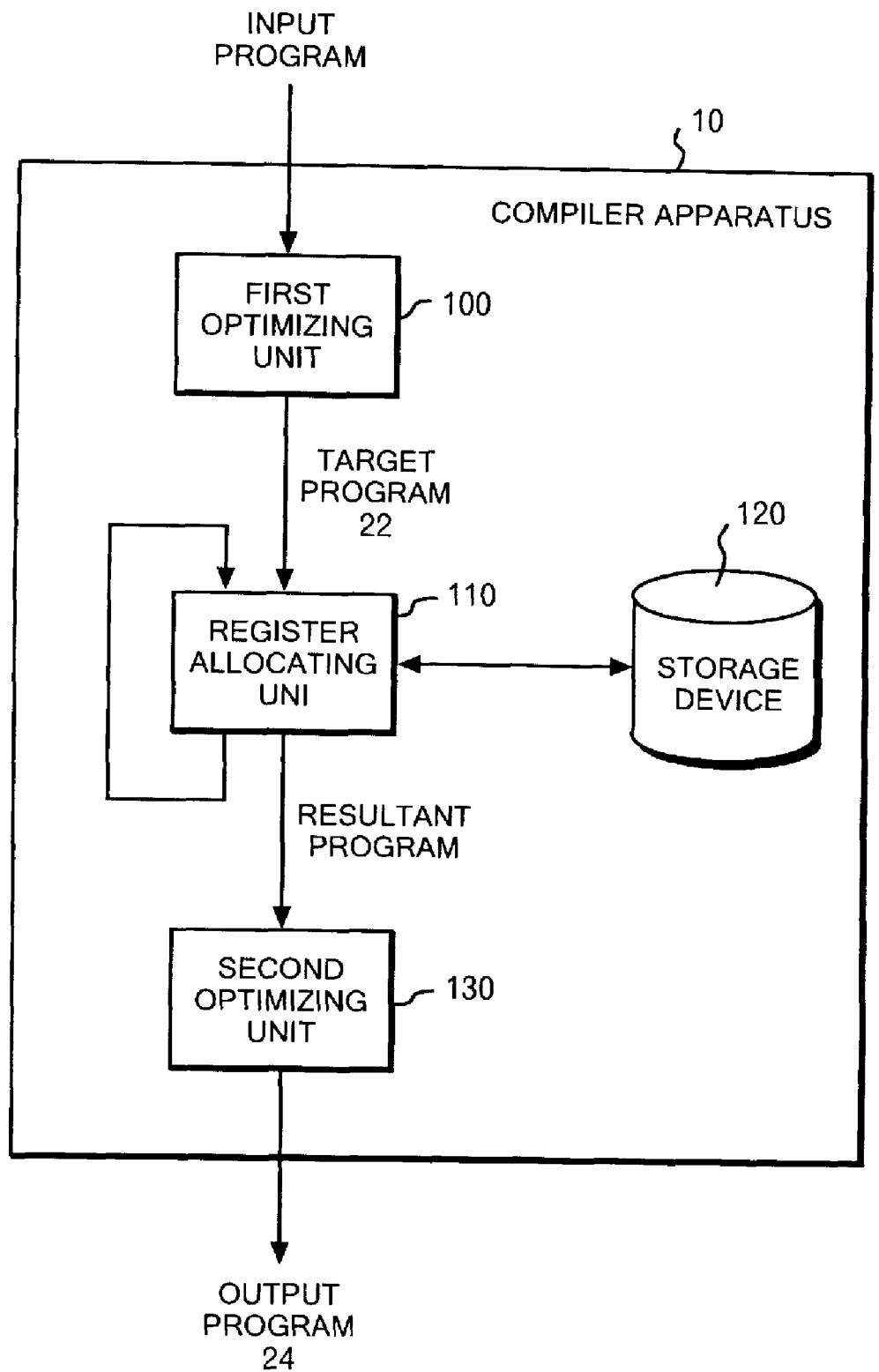
FIG. 1 shows an entire configuration of a compiler apparatus 10 according to an embodiment of the present invention.

FIG. 1 shows an entire configuration of a compiler apparatus 10 according to this embodiment. The compiler apparatus 10 converts an inputted program into a machine language program and outputs the machine language program. In addition to this, the compiler apparatus 10 performs optimization to achieve the efficient execution of the machine language program. Specifically, the compiler apparatus 10 includes a first optimizing unit 100, a register allocating unit 110, a storage device 120 and a second optimizing unit 130.

The first optimizing unit 100 receives a program to be compiled. This program is referred to as an input program. Then, the first optimizing unit 100 performs various processes on the input program for optimization. For example, the first optimizing unit 100 may analyze a live range of each variable used in the input program. When a certain variable has multiple live ranges discontinuous with each other, the first optimizing unit 100 may split the variable into multiple variables, holding the values of the variable for the respective live ranges. The program variously processed by the first optimizing unit 100 is referred to as a target program 22.

The register allocating unit 110 allocates a register to a variable used in the target program 22. A program targeted for register allocation is not limited to a program itself inputted to the compiler apparatus 10, but includes the program resulting from a certain process on the input program. Similarly, a variable targeted for register allocation is also not limited to a variable in a program inputted to the compiler apparatus 10, but also includes a variable generated as a result of a certain process on the input program.

In order to perform register allocation, the register allocating unit 110 may generate various kinds of information by analyzing the target program 22, and store the information in the storage device 120. Then, the register allocating unit 110 allocates registers to variables by referring to these kinds of information stored in the storage device 120. The information stored in the storage device 120 includes, for example, interference information indicating interference relationships between variables; assignment information indicating a relationship between each pair of an assignment destination to which a variable is assigned, and an assignment source from which the assigned variable is taken out; a priority indicating a priority in allocating the register to each variable; and the like.

The register allocating unit 110 generates and outputs a program having variables to which the registers are allocated (this program is referred to as a resultant program 69). The register allocating unit 110 may further receive this resultant program 69. In this case, the register allocating unit 110 may regard, as a variable, each register included in the resultant program 69, and further allocate the register to the variable. The register allocating unit 110 may iterate the above processes until a certain condition is established.

The second optimizing unit 130 performs various processes on this resultant program 69. For example, the second optimizing unit 130 may delete, from the resultant program 69, an instruction to assign a value from and to the same register. The resultant program 69 thus processed variously is outputted as an output program 24 to the outside of the compiler apparatus 10. By executing the output program 24, an external apparatus is enabled to perform various kinds of processes in accordance with the intention of the creator of the input program.

Figure 2:
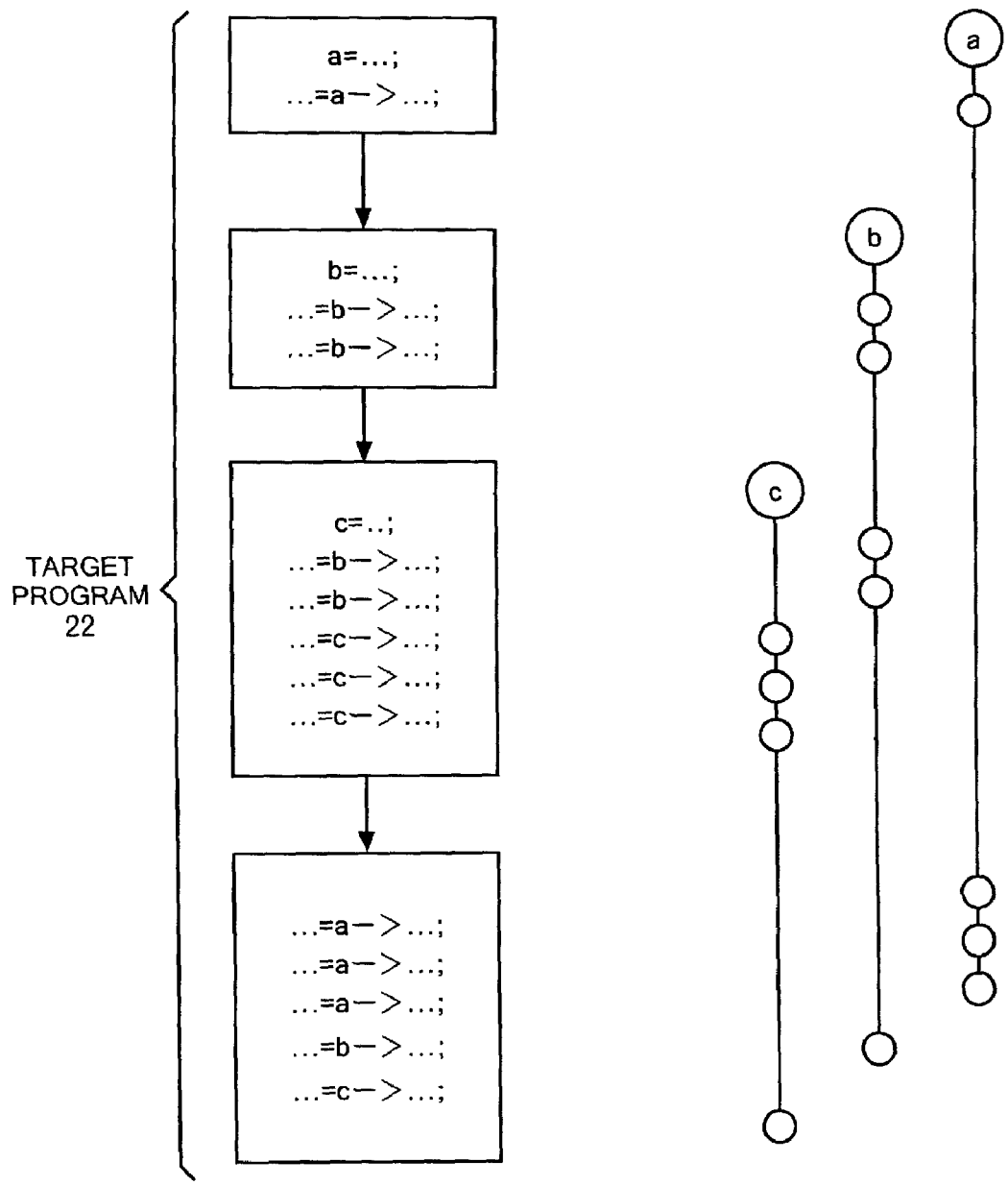
FIG. 2 shows a use status of each variable used in a target program 22 according to an embodiment of the present invention.

FIG. 2 shows a use status of each variable used in the target program 22. As shown on the left side of FIG. 2, the target program 22 is often split into multiple parts, for example, called basic blocks in an early stage of optimization. Each of the basic blocks includes one or more instructions continuously executed, and does not includes any instruction functioning as a branch source or branch destination of a conditional branch instruction except for the first and last instructions.

The first basic block includes an instruction to assign a value to a variable a, and an instruction to refer to the variable a. A symbol "=" denotes an instruction to refer to the right side thereof and to assign the referred value to the left side thereof. A symbol "->" denotes a pointer operator, and indicates an operation for reading data from an area defined by the right side of the symbol, in a memory area having an address defined by the value of the variable on the left side of the symbol. Accordingly, "a-> . . . " causes the value of the variable a to be referred to as an address.

Similarly, the second basic block includes an instruction to assign a value to a variable b, and two instructions to refer to the value of the variable b. The third basic block includes an instruction to assign a value to a variable c, two instructions to refer to the value of the variable b, and three instructions to refer to the value of the variable c. The fourth basic block includes three instructions to refer to the value of the variable a, an instruction to refer to the value of the variable b, and an instruction to refer to the value of the variable c.

As shown on the right side of FIG. 2, the live range of a variable is a period after a particular value is assigned to the variable until the value is used for the last time. To use a variable means to refer to the value of the variable, for example. In FIG. 2, a circle surrounding an alphabet symbol indicating a variable denotes an assignment of a value, and a circular not including the alphabet indicating a variable denotes a use of a value. The live range of each variable is expressed with a straight line connecting these circles to each other. Here, illustrative description of the variable a is provided. In the first place, the value is assigned to the variable a in response to the first instruction in the first basic block, and then is used for the last time in response to the third instruction in the fourth basic block after being used three times. In the following description, a continuous live range is expressed as a continuous straight line as shown in FIG. 2 in order to help for intuitional understanding of the live range.

Note that, as a program after compiling is compared with the program before the compiling, a statement including a numeric value, a character string and a symbol is transformed into an instruction including an operator, a register, an address and a constant value. In addition, an intermediate code, which is an abstract concept of the operator, may be used in the course of compiling. On the other hand, various kinds of operations expressed in the program are substantially the same in terms of functions. For this reason, in this embodiment, a group of terms, such as instruction, assignment, reference, load and store, and the like, which are originally appropriate for use for the program either before or after the compiling, is used commonly for the program in any stage of the compiling, as is often the case in this technical field.

Figure 3:
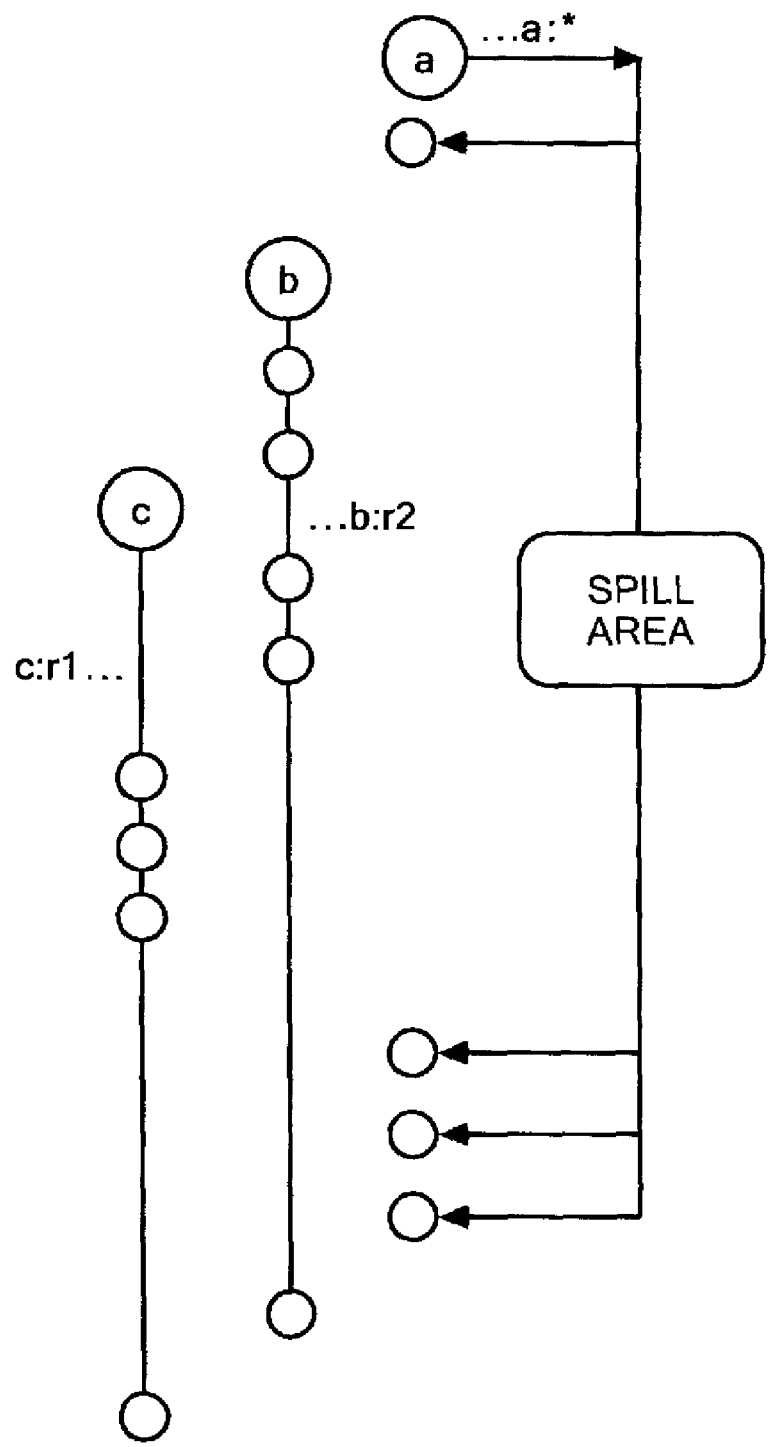
FIG. 3 shows one example of a register allocation result in a case where a particular register consistently holds the value of each variable according to an embodiment of the present invention.

FIG. 3 shows an example of a register allocation result in a case where a particular register holds one of variable values consistently. In this example, there are two registers usable to execute the target program 22. Thus, a register r1 is allocated to a variable c, while a register r2 is allocated to a variable b. The registers r1 and r2 consistently hold the variables b and c, respectively. On the other hand, any register is not allocated to a variable a. As a result, the value of the variable a is stored in a memory, and is read from the memory every time a reference is made (this operation is referred to as "spill"). In this example, since the variable a is referred to four times, the value of the variable a is read four times, and is abandoned upon completion of the use after each reading.

Figure 4:
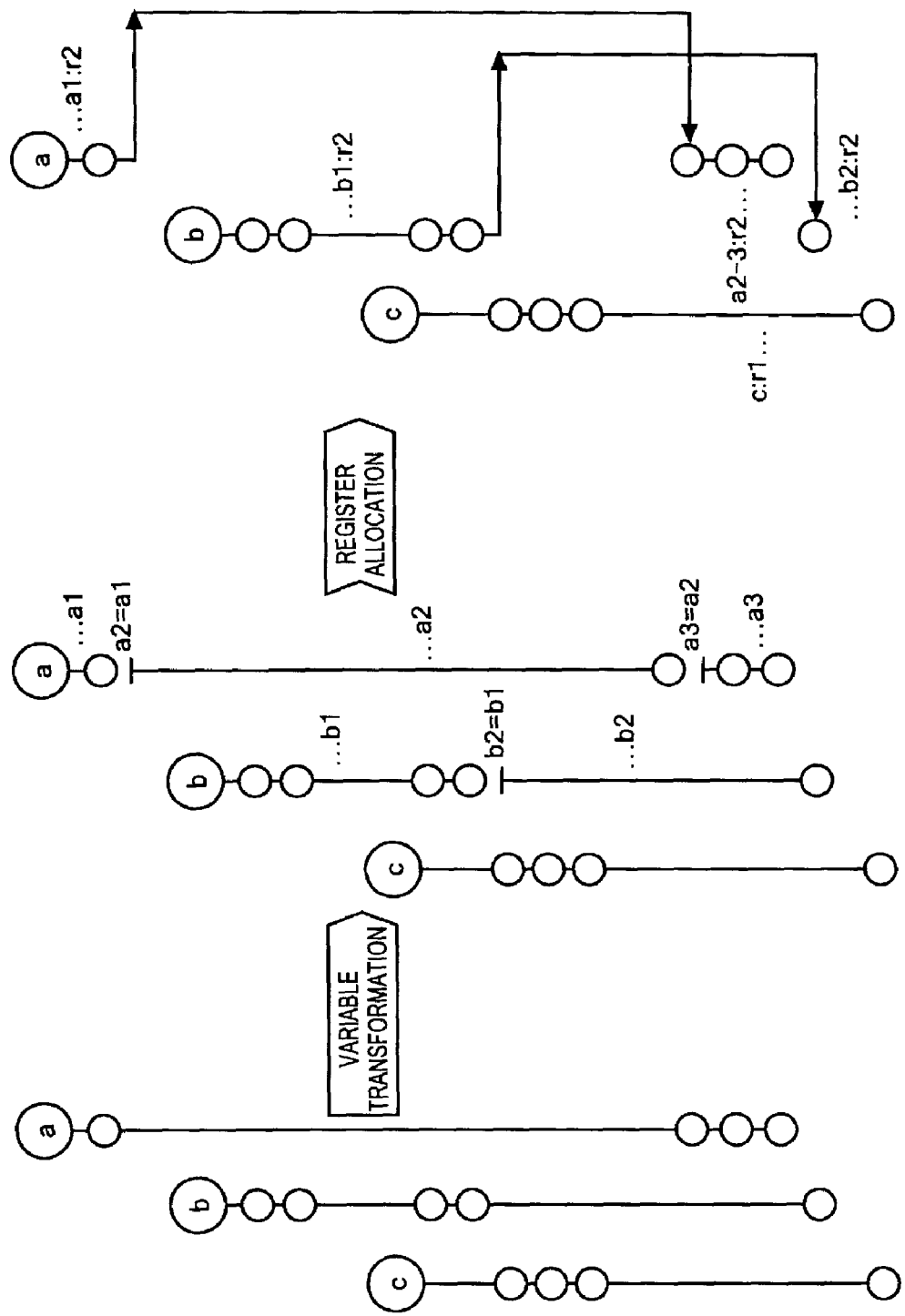
FIG. 4 shows a first example of a register allocation result in a case where registers are allocated to multiple variables after each variable is transformed into the multiple variables according to an embodiment of the present invention.

FIG. 4 shows a first example of a register allocation result in a case where each of variables is split into multiple variables, and then where registers are allocated to the multiple variables. The left side of FIG. 4 shows a live range of each variable. This drawing is the same as the drawing on the right side of FIG. 2. The register allocating unit 110 transforms each of a variable a and a variable b into multiple variables. The variable b is transformed into variables b1 and b2, and the variable a is transformed into variables a1, a2 and a3. In addition, generated are three instructions: to assign the value of the variable b1 to the variable b2; to assign the value of the variable a1 to the variable a2; and to assign the value of the variable a2 to the variable a3.

The register allocating unit 110 allocates a register to each of the transformed variables. For example, the register allocating unit 110 allocates the register r2 to the variable a1, the register r2 to the variable a3, the register r2 to the variable b1, and the register r1 to the variable c.

The variable a2 and the variable b2 do not have any register allocated thereto. Accordingly, these variables are temporarily stored in a memory, and read from the memory for every use. As a result, the process for reading the value from the memory is executed twice for the two variables a2 and b2. According to this example, the number of times of reading the values is reduced by spilling as compared with FIG. 3. Moreover, the assignment instructions temporarily generated become unnecessary.

Figure 5:
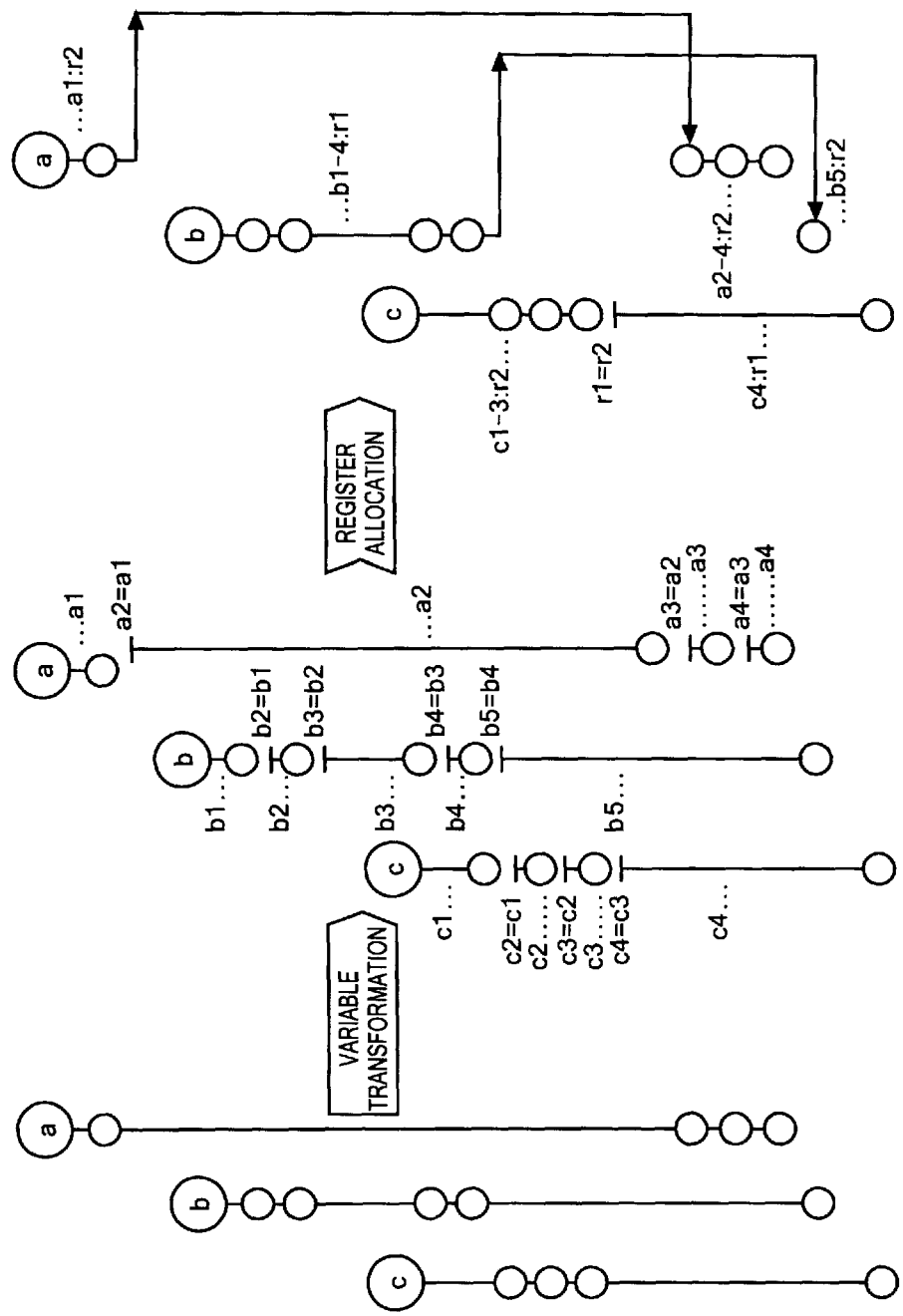
FIG. 5 shows a second example of a register allocation result in a case where registers are allocated to multiple variables after each variable is transformed into the multiple variables according to an embodiment of the present invention.

FIG. 5 shows a second example of the register allocation result in a case where each of variables is split into multiple variables, and then where registers are allocated to the multiple variables. The left side of FIG. 5 shows a live range of each variable. FIG. 5 shows the diagrams in the same format as the diagram on the right side of FIG. 2. The register allocating unit 110 transforms each of variables a to c into multiple variables. The variable b is transformed into variables b1, b2, b3, b4 and b5, and the variable a is transformed into variables a1, a2, a3 and a4. The variable c is transformed into variables c1, c2, c3 and c4.

In addition, with this transformation, the following assignment instructions are generated. Precisely, these are instructions to assign: the values of the variables c1, c2 and c3 to the variables c2, c3 and c4, respectively; the values of the variables b1, b2, b3 and b4 to the variables b2, b3, b4 and b5, respectively; and the values of the variables a1, a2 and a3 to the variables a2, a3 and a4, respectively.

The register allocating unit 110 allocates a register to each of the transformed variables. For example, the register allocating unit 110 allocates the register r2 to the variables a1, a3 and a4. Moreover, the register allocating unit 110 allocates the register r1 to the variables b1 to b4. Then, the register allocating unit 110 allocates the register r2 to the variables c1 to c3, and the register r1 to the variable c4.

As is the same with the example in FIG. 4, the variable a2 and the variable b5 do not have any register allocated thereto. Accordingly, these variables are temporarily stored in a memory, and read from the memory for every use. As a result, the process for reading the value from the memory is executed twice for the two variables a2 and b5.

As is different from the example in FIG. 4, however, the different registers are allocated to the variables c1 to c3, and the variable c4. For this reason, it is necessary to use the instruction to assign the value, from the register r2 holding the values of the variables c1 to c3, to the register r1 holding the value of the variable c4. In this way, the excessive splitting of a variable requires too many assignment instructions between registers. Accordingly, the execution efficiency of the program may decrease in some cases.

In contrast, the compiler apparatus 10 according to this embodiment is capable of achieving the efficient execution of a program as a whole by balancing a reduction in spills by splitting variables appropriately, and a reduction in assignment instructions generated in response to the splitting. The more detailed description will be given below.

Figure 6:
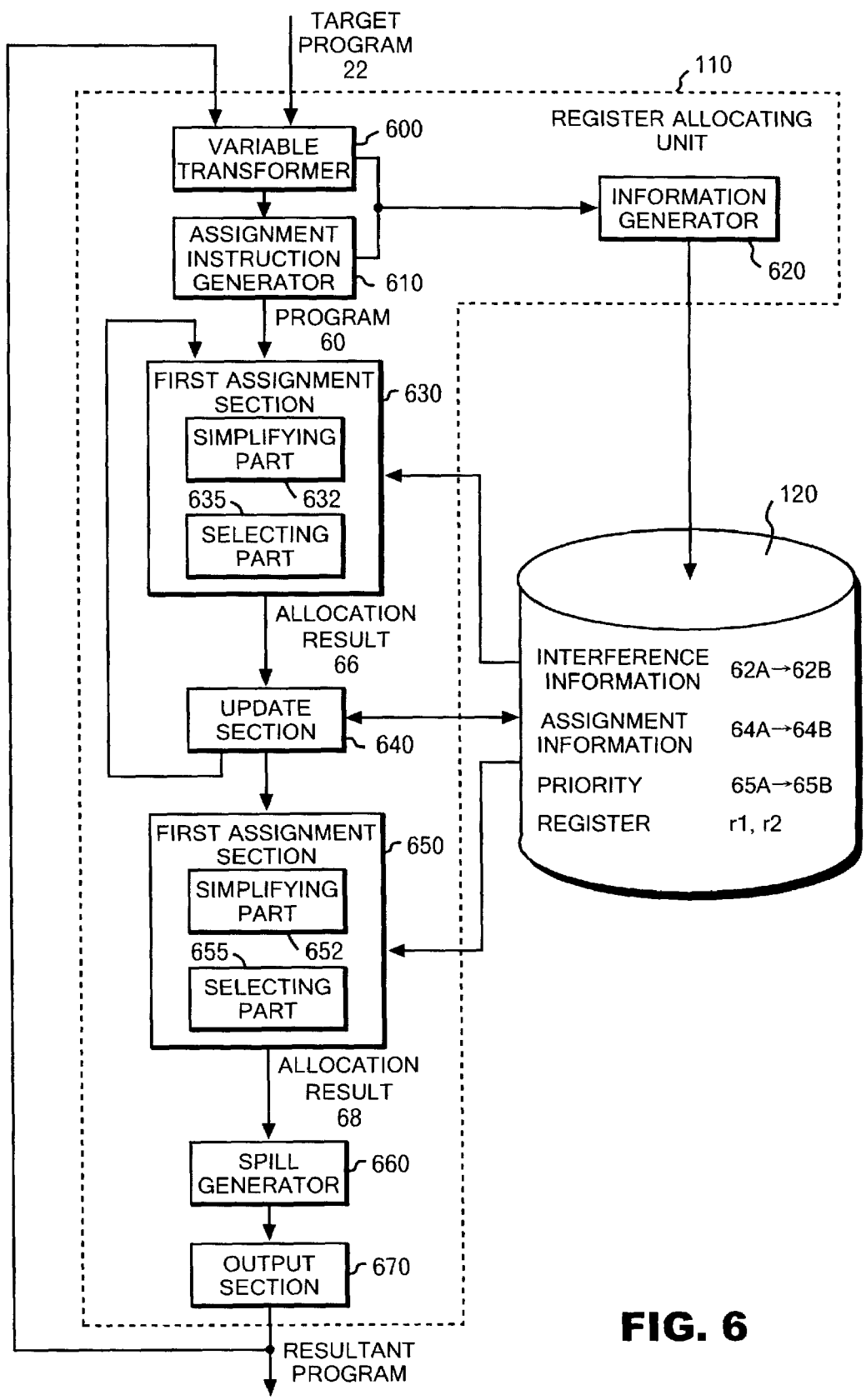
FIG. 6 shows one example of a functional configuration of a register allocating unit 110 according to an embodiment of the present invention.

FIG. 6 shows an example of a functional configuration of the register allocating unit 110 according to this embodiment. The register allocating unit 110 includes a variable transformer 600, an assignment instruction generator 610, an information generator 620, a first allocation section 630, an update section 640, a second allocation section 650, a spill generator 660 and an output section 670. The variable transformer 600 transforms each variable in the target program 22 into multiple variables. This transformation may be implemented as follows. For example, the variable transformer 600 splits the live range of a certain variable into multiple live ranges, and generates multiple variables holding the values of the certain variable for the respective split live ranges. Specifically, the variable transformer 600 may split the live range of a certain variable according to the execution frequency of each part of the target program 22 or the use frequency of the certain variable. More specifically, the variable transformer 600 may split the live range of a certain variable into a live range corresponding to a part in the target program 22 having a higher execution frequency than a baseline, and into a live range corresponding to a part in the target program 22 having a lower execution frequency than the baseline. In addition, the variable transformer 600 may split the live range of a certain variable by using a point of assignment of or reference to the certain variable as a boundary.

Figure 7:
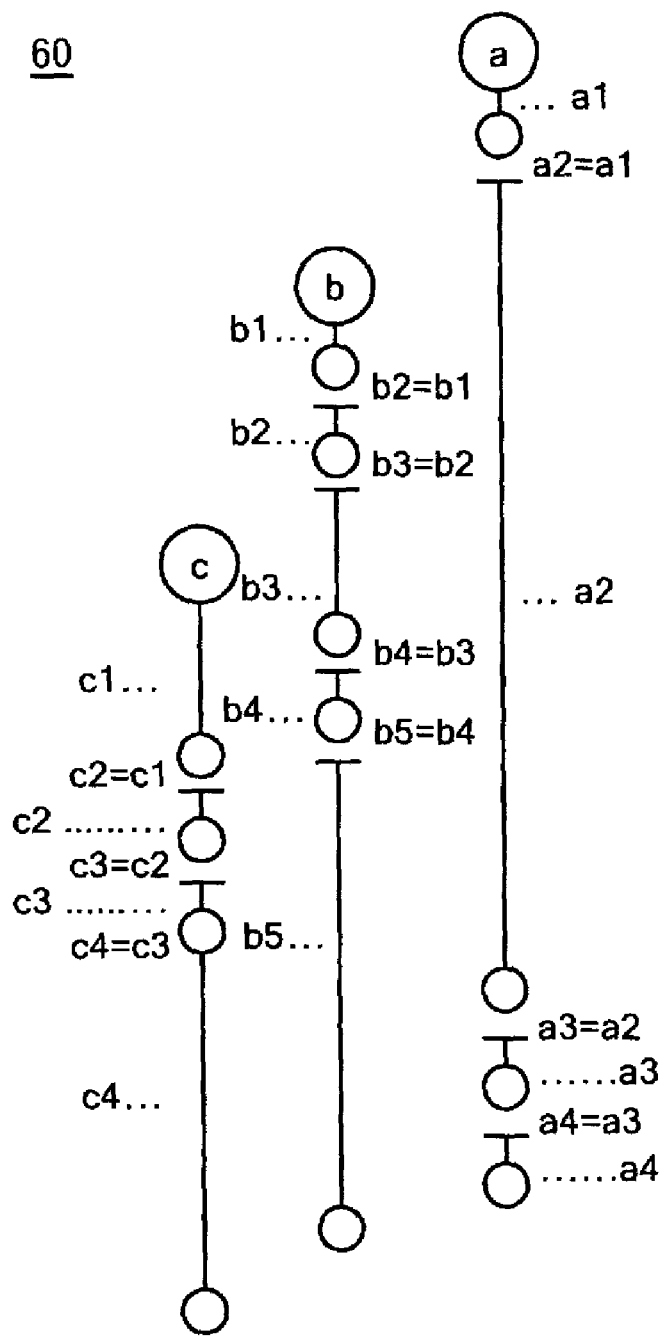
FIG. 7 shows one example of a program 60 according to an embodiment of the present invention.

In the target program 22, the assignment instruction generator 610 generates an instruction to assign a value from a given variable to another variable among the multiple transformed variables. For example, when a variable a is transformed into variables a1 and a2, the assignment instruction generator 610 generates an instruction to assign the value to the variable a2 from the variable a1. In this way, the assignment instruction generator 610 may generate an assignment instruction at a boundary between the live ranges of each pair of variables having successive live ranges. A program having variables transformed and having assignment instructions generated is referred to as a program 60. FIG. 7 shows one example of the program 60.

FIG. 7 shows one example of the program 60 according to this embodiment. A variable c is transformed into variables c1 to c4. A variable b is transformed into variables b1 to b5. A variable a is transformed into variables a1 to a4. In addition, instructions to assign the value to the variable c2, c3 and c4 from the variable c1, c2 and c3, respectively, are generated.

Moreover, instructions to assign the values of the variables b2, b3, b4 and b5 from the variables b1, b2, b3 and b4 are also generated. Furthermore, instructions to assign the values to the variable a2, a3 and a4 from the variables a1, a2 and a3, respectively, are generated.

Figures 8, 9:
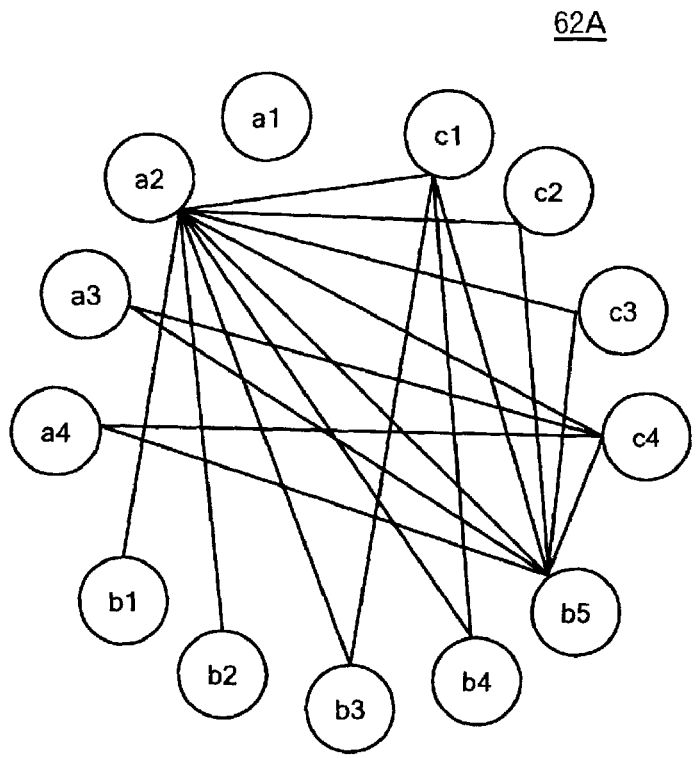
FIG. 8 shows one example of interference information 62A according to an embodiment of the present invention.
FIG. 9 shows the example of the assignment information 64A according to an embodiment of the present invention.

The description returns to FIG. 6. The information generator 620 generates, as interference information 62A, information indicating interference relationships between the multiple variables used in the target program 22, and stores the interference information 62A in the storage device 120. The multiple variables used in the target program 22 here do not include the variables before the transformation by the variable transformer 600, but only includes the variables after the transformation by the variable transformer 600. In addition, the interference relationship is here defined as a relationship in which a given variable and another variable each hold an effective value at the same time in any time point during the execution of the target program 22. The "effective" value mentioned here denotes a value stored in a variable after the value is assigned to the variable for the first time until the value is used for the last time. FIG. 8 shows one example of the interference information 62A.

FIG. 8 shows the example of the interference information 62A according to this embodiment. The interference information 62A may have a data structure in a graph format called an interference graph. The interference graph is a graph in which each variable used in the program 60 is expressed as a node while each pair of nodes representing variables having an interference relationship is connected to each other with an edge.

In the example in FIG. 8, the variable a2 has interference relationships with all the variables c1 to c4 and the variables b1 to b5. Accordingly, the node representing the variable a2 is directly connected to all the nodes representing the variables c1 to c4 and the variables b1 to b5, with the edges. The variable b5 has interference relationships with all the variables c1 to c4 and the variables a2 to a4. Thus, the node representing the variable b5 is directly connected to all the nodes representing the variables c1 to c4 and the variables a2 to a4, with the edges.

The variable c4 has interference relationships with all the variables a2 to a4 and the variable b5. Accordingly, the node representing the variable c4 is directly connected to all the nodes representing the variables a2 to a4 and the variable b5, with the edges. Moreover, the variable c1 has interference relationships with all the variables b3 to b5 and the variable a2. Thus, the node representing the variable c1 is directly connected to all the nodes representing the variables b3 to b5 and the variable a2 with the edges. On the other hand, since the variable a1 does not have an interference relationship with any variable, the node representing the variable a1 is not connected directly to any node with an edge. The description returns to FIG. 6.

Further, the information generator 620 generates assignment information 64A indicating each pair of variables used as the assignment source and the assignment destination in the assignment instruction generated by the assignment instruction generator 610, and stores the assignment information 64A in the storage device 120. This assignment information may be obtained by detecting the assignment instructions between the variables, from the target program 22, through the scanning of the target program 22. FIG. 9 shows one example of the assignment information 64A.

FIG. 9 shows the example of the assignment information 64A according to this embodiment. The assignment information 64A may have a matrix data structure in which all the variables used in the program 60 are aligned in both line and column directions. Then, in the assignment information 64A, the numerical value of 1 is associated with a pair of variables having an assignment source-destination relationship in the assignment instruction, while the numerical value of 0 is associated with a pair of variables not having such a relationship.

For instance, as shown in FIG. 7, the variable a2 is the assignment destination of the assignment instruction designating the variable a1 as the assignment source, and is the assignment source of the assignment instruction designating the variable a3 as the assignment destination. Accordingly, in the assignment information 64A, the pair of the variables a2 and a1 and the pair of the variables a2 and a3 are each associated with the numerical value of 1.

The variable a2 does not have the assignment source-destination relationship in the assignment instruction with any of the other remaining variables. Thus, the other pairs of the variable a2 and the other remaining variables are each associated with the numerical value of 0. The same is true in the other variables. Precisely, the pair of the variables a4 and a3 is associated with the numerical value of 1, and the pair of the variables b2 and b1 and the pair of the variables b2 and b3 are each associated with the numerical value of 1. Moreover, the pair of the variables b4 and b3 and the pair of the variables b4 and b5 are each associated with the numerical value of 1.

The pair of the variables c2 and c1 and the pair of variables c2 and c3 are associated with the numerical value of 1. Moreover, the pair of variables c3 and c4 is associated with the numerical value of 1. By use of the above-illustrated assignment information 64A, the information generator 620 can determine quickly whether each of the variables and each of the other variables have a relationship in which the variable value is assigned between the two variables, without scanning the program 60.

Figures 10, 11:
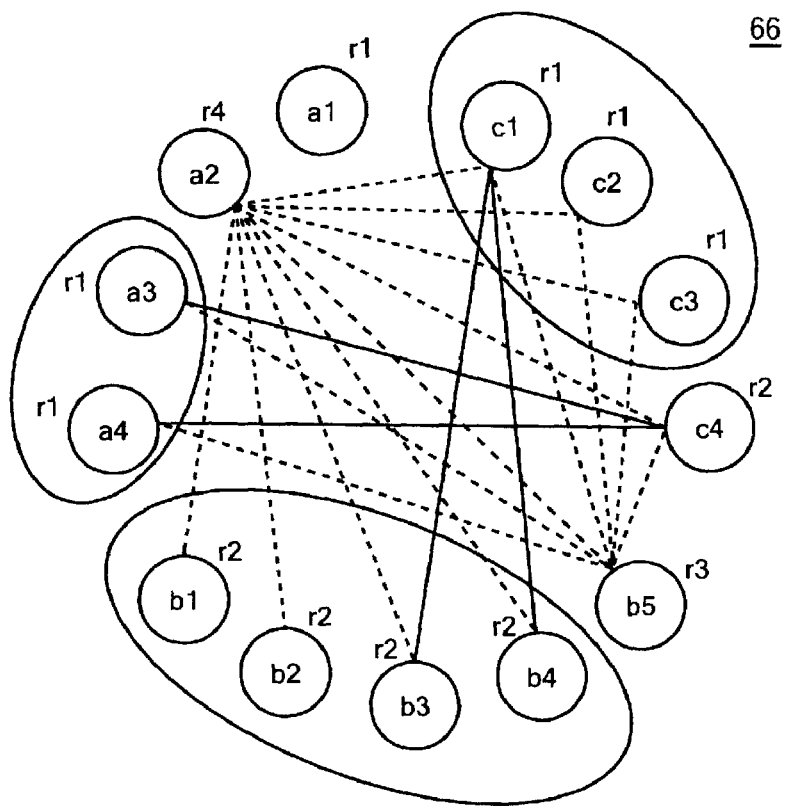
FIG. 10 shows one example of priorities 65A according to an embodiment of the present invention.
FIG. 11 shows one example of an allocation result 66 according to an embodiment of the present invention.

The description returns to FIG. 6. Moreover, the information generator 620 may generate priorities 65A according to which a register is allocated to each variable, and may store the priorities 65A in the storage device 120. FIG. 10 shows one example thereof.

FIG. 10 shows the example of the priorities 65A according to this embodiment. In the priorities 65A, each variable used in the program 60 is associated with a gain that can be obtained by allocating a register to the concerned variable, the number of variables having interference relationships with the concerned variable (degree), and a cost that is a loss produced by spilling the concerned variable. This cost is one example of the priorities according to the present invention. The higher the cost, the higher the priority in register allocation is.

The gain of a given variable is based on the frequency of use of the given variable in the program 60, for example. This is because the execution efficiency is enhanced more by allocating the register to a variable having a higher frequency of use. The cost is calculated by dividing the gain (x) by the degree (y). This is because the spilling of a variable having a larger degree (y) allows more variable to have registers allocated thereto, so that this spilling causes only a small loss.

Precisely, the information generator 620 scans the program 60 and detects instructions referring to each variable. Then, the information generator 620 adds up the number of detected instructions for each variable. In the storage device 20, the information generator 620 stores, as the gain for each variable, the number of instructions added up for the concerned variable. Specifically, since the frequency of use of each of the variables a1 to a4, b1 to b5 and c1 to c4 is 1, the gain is 1.

Further, the information generator 620 scans the interference information 62A stored in the storage device 120 to calculate the number of edges connected to each of the variables. Thereafter, the information generator 620 stores the calculated number as the degree in the storage device 120. The information generator 620 calculates the cost by dividing the gain of each of the variable by the degree of the concerned variable, and stores the calculated cost in the storage device 120.

The description returns to FIG. 6. In accordance with a predetermined procedure, the first allocation section 630 selects one of a predetermined number of or more registers, and allocates the selected register to each of the variables used in the program 60. This allocation process is performed without allocating the same register to a pair of variables having the interference relationship for the following reason. If the same register is allocated to a pair of variables having the interference relationship, the register is caused to hold the two variables at the same time, so that the program cannot operate normally any more.

The first allocation section 630 includes a simplifying part 632 and a selecting part 635 as specific components. Although the detailed description will be provided later, the general information thereof is presented here. The simplifying part 632 selects each of variables in accordance with a certain reference, and pushes the selected variable onto a stack, while iterating a process to remove the interference relationships of the concerned variable from the interference information 62A until the completion of pushing of all the variables targeted for register allocation.

The stack mentioned here is built by use of a working space temporarily provided in the storage device 120, for example. Here, the stack denotes a memory area having a data structure simply capable of an LIFO (Last In First Out) type operation, for example. Additionally, the predetermined base number denotes the upper limit number of physical registers that are registers usable to execute the program 60.

Then, subsequently, the selecting part 635 pops a variable from this stack, and allocates, to the popped variable, a register other than the registers already allocated to the other variables having the interference relationship with the popped variable. The selecting part 635 iterates this process until the stack becomes empty. This process is preferably performed by means of a technique called biased coloring described in Non-patent Document 1. Instead of this, this process may also be based on any of the other register allocation algorithms.

Otherwise, the selecting part 635 may select a register to be allocated, from a group of registers obtained by adding at least one virtual register to the base number of physical registers. Here, the virtual register denotes a register not actually usable to execute the program 60. The information on the base number and the allocatable physical registers may be stored in advance in the storage device 120. Alternatively, the compiler apparatus 10 may determine the base number and the allocatable physical registers according to parameters given to the compiler apparatus 10 during the operation. For example, the number of physical registers to be used may be determined depending on which type of computer to execute a program resulting from compiling. This allocation result is referred to an allocation result 66. One example of this is shown in FIG. 11.

FIG. 11 shows the example of the allocation result 66 according to this embodiment. The physical register r1 is allocated to the variable a1. The physical register r1 is allocated to each of the variables a3 to a4. The physical register r2 is allocated to each of the variables b1 to b4. The physical register r1 is allocated to each of the variables c1 to c3. The physical register r2 is allocated to the variable c4. Meanwhile, the virtual register r4 is allocated to the variable a2, and the virtual register r3 is allocated to the variable b5.

Note that a set of variables having the same register allocated thereto and having assignment source-destination relationships in the assignment instructions is expressed as a group for the following description. Specifically, the variables a3 and a4 are grouped, the variables c1 to c3 are grouped and the variables b1 to b4 are grouped.

The description returns to FIG. 6. On condition that the same register is allocated to multiple variables by the first allocation section 630, and that the multiple variables are associated with each other in the assignment information 64A, the update section 640 replaces the multiple variables with a new variable. For instance, the update section 640 may rewrites the content of the program 60. Then, the update section 640 reads the interference relationships for each of the multiple variables from the interference information 62A in the storage device 120, and merges the read interference relationships. The merged interference relationships are used as an interference relationship for the new variable. Thereafter, the update section 640 updates the interference information 62A according to the generated interference relationships. This updated interference information is referred to as interference information 62B. In addition to this, the update section 640 may update the assignment information 64A and the priorities 65A and store the updated information and priorities as assignment information 64B and priorities 65B in the storage device 120.

Figures 12, 13:
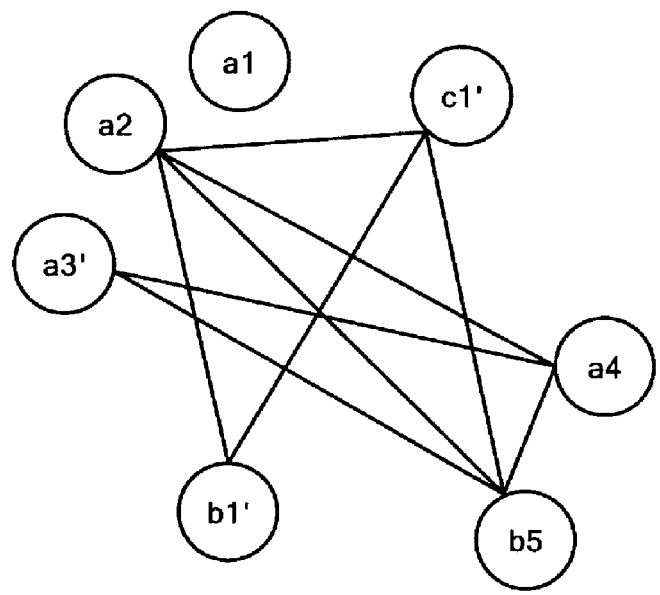
FIG. 12 shows one example of interference information 62B according to an embodiment of the present invention.
FIG. 13 shows one example of assignment information 64B according to an embodiment of the present invention.
Figures 14, 15:
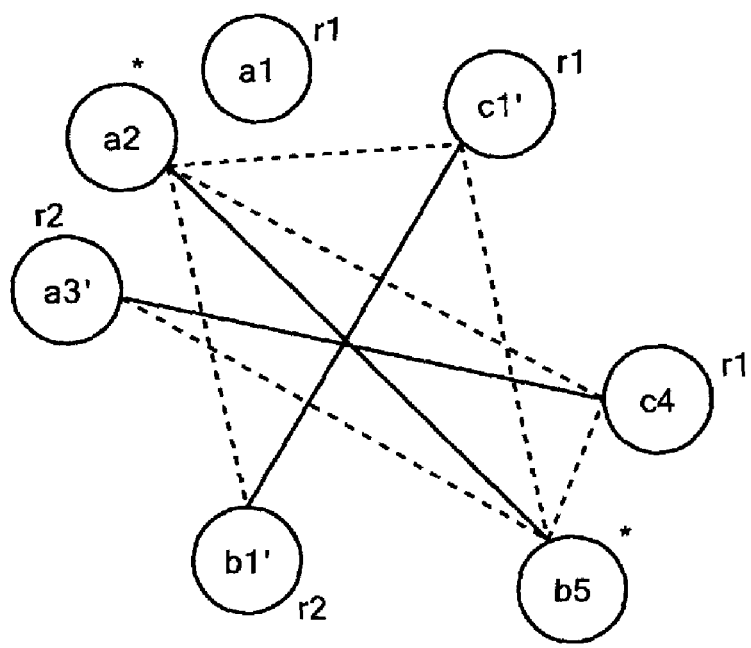
FIG. 14 shows one example of priorities 65B according to an embodiment of the present invention.
FIG. 15 shows one example of an allocation result 68 according to an embodiment of the present invention.

FIGS. 12 to 14 show examples of these updated ones.

FIG. 12 shows one example of the interference information 62B according to this embodiment. The update section 640 replaces the multiple variables classified into one group in FIG. 11, with a single new variable. For example, the update section 640 replaces the variables c1 to c3 with a variable c1', replaces the variables a3 to a4 with a variable a3', and replaces the variables b1 to b4 with a variable b1'.

With these variables replacements, the update section 640 replaces, with a single new node, the multiple nodes in the interference graph respectively representing the multiple replaced variables. After that, the update section 640 also replaces all the edges between the multiple nodes and other nodes in the interference graph, with edges between the single new node and the other nodes.

Specifically, the variable c1 before replacement (hereinafter, pre-replacement variable) has the interference relationship with each of the variables a2, b3, b4 and b5. In addition, the pre-replacement variable c2 has the interference relationship with each of the variables a2 and b5. Moreover, the pre-replacement variable c3 has the interference relationship with each of the variables a2 and b5. The update section 640 calculates a union of variables each having the interference relationship with any one of the variables c1 to c3. As a result, the variables a2, b3, b4 and b5 are calculated as the union.

After that, the update section 640 generates an interference relationship between the variable c1' after replacement (hereinafter, post-replacement variable), and each of the variables in this union, and includes the generated interference relationship in the interference information 62B. Here, the variables b3 and b4 are also replaced with a new variable b1'. For this reason, the interference relationships concerning the variables b3 and b4 are also replaced with the interference relationships concerning the new variable b1'. Consequently, the update section 640 generates an interference relationship between the variable c1' and each of the variables a2, b1' and b5, and includes the generated interference relationship in the interference information 62B.

FIG. 13 shows one example of the assignment information 64B according to this embodiment. From the program 60, the update section 640 deletes the instructions to assign a value from or to the multiple pre-replacement variables. In addition, in the program 60, the update section 640 also replaces an instruction for value assignment between any of the multiple pre-replacement variables and any other variable, with an instruction for value assignment between the single new variable and the other variable.

For example, the update section 640 deletes an instruction for value assignment between the pre-replacement variables c1 to c3, for example, the instruction to assign a value to the variable c2 from the variable c1. In addition, as for the variables c1 to c3, the instruction to assign a value to the variable c4 from the variable c3 is replaced with the instruction to assign a value to the variable c4 from the post-replacement variable c1'.

Thereafter, the update section 640 scans the program 60 having the assignment instructions replaced or deleted, and detects the current assignment instructions. Then, the update section 640 generates the assignment information 64B based on the detection result. For example, the update section 640 may generate information indicating that the variable c1' and the variable c4 have an assignment source-destination relationship in the assignment instruction, and includes the generated information in the assignment information 64B.

FIG. 14 shows one example of the priorities 65B according to this embodiment. The update section 640 calculates the total sum of the gains respectively corresponding to the multiple pre-replacement variables, and sets the total sum as a gain for the single new post-replacement variable. Moreover, on the basis of the interference information 62B, the update section 640 calculates the degree of the node in the interference graph representing the single new post-replacement variable.

The pre-replacement variables c1 to c3 are each associated with a gain of 1. Accordingly, the update section 640 calculates the total sum of these gains in association with the gain of the post-replacement variable c1', and stores the calculated total sum in the storage device 120 with the total sum included in the priorities 65B. Moreover, the degree of the node in the interference graph representing the post-replacement variable c1' is 3 in the interference information 62B. For this reason, the update section 640 calculates a degree of 3 in association with variable c1', and stores the degree of 3 in the storage device 120 with the degree of 3 included in the priorities 65B.

On the basis of the gain and degree thus calculated, the update section 640 may calculate a cost caused by splitting each variable, and may store the cost in the storage device 120 with the cost included in the assignment information 64B. The description returns to FIG. 6.

A determination is made as to whether or not a certain termination condition is established, that is, whether or not the register allocation by the first allocation section 630 and the information update by the update section 640 are performed a predetermined number of times, or the like condition. When the termination condition is not established, the first allocation section 630 again performs the register allocation for the program having the variables replaced.

In this case, the update section 640 updates the interference information 62B to generate interference information 62C, updates the assignment information 64B to generate assignment information 64C, and updates the priorities 65B to generates priorities 65C. In this way, all the kinds of information are updated sequentially according to the number of iterations.

Incidentally, the following description is based on the assumption that such iteration is not performed, and that the update section 640 finally generates the interference information 62B, the assignment information 64B and the priorities 65B.

In accordance with the same procedure as the aforementioned predetermined procedure of the first allocation section 630, the second allocation section 650 selects a register among the physical registers of a number equal to the base number and allocates a register to each variable in the program 60 using the new variable instead of the multiple variables having the same register allocated by the first allocation section 630. This allocation is performed independently of the allocation result by the first allocation section 630, and starts from the state there are no registers allocated to variables. In addition, this allocation is performed without allocating the same register to a set of variables having the interference relationships based on the updated interference information 62B. If such allocation is not possible, the second allocation section 650 determines to spill a certain variable in accordance with a predetermined reference.

A specific configuration example of the second allocation section 65 is basically the same as that of the first allocation section 630. The second allocation section 650 includes a simplifying part 652 and a selecting part 655. The detailed description of these parts will be provided later.

The allocation result by the second allocation section 650 is referred to as an allocation result 68. FIG. 15 shows one example of the allocation result 68.

FIG. 15 shows the example of the allocation result 68 according to this embodiment. The second allocation section 650 allocates the register r1 to the variables a1, c1' and c4. In addition, the second allocation section 650 allocates the register r2 to the variables a3' and b1'. The second allocation section 650 determines to spill each of the variables a2 and b5. The description returns to FIG. 6.

In the program 60, the spill generator 660 generates various instructions for spilling a first variable on condition that the second allocation section 650 determines to spill the first variable. For example, the spill generator 660 transforms the instruction to assign a variable value to the first variable into an instruction to store, in an area on the memory, the value stored in the register storing the variable value of the first variable therein. In addition, the spill generator 660 transforms the instruction to refer to the variable value of the first variable, into instructions to read the variable value from the area on the memory, to store the variable value in the register, and to refer to the value of the register.

The output section 670 outputs, as the resultant program 69 to second optimizing unit 130 and the like, the program having the registers allocated to the variables by the second allocation section 650, and having the instructions for spilling generated by the spill generator 660. The instructions for spilling include, for instance, an instruction to write a variable value to the memory from a register temporarily storing the variable value every time the variable value is defined, and an instruction to read the variable value from the area on the memory to the register every time the variable value is used.

Thereafter, the variable transformer 600 may iterate the foregoing process by regarding as a variable each register in the resultant program 69.

Figure 16:
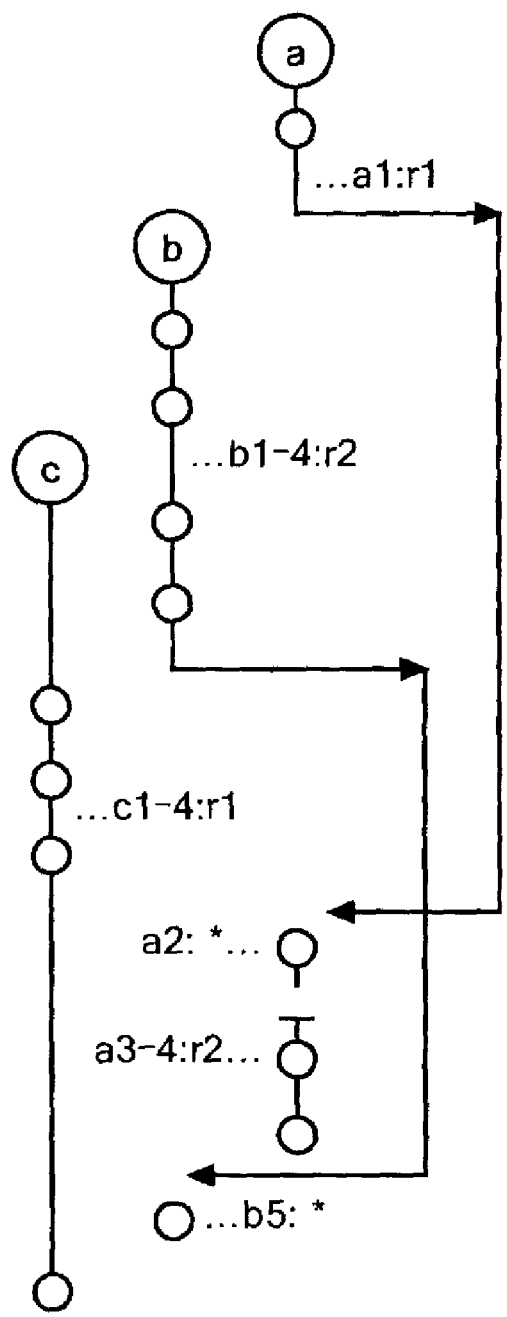
FIG. 16 shows one example of an output program 24 according to an embodiment of the present invention.

FIG. 16 shows one example of the output program 24 according to this embodiment. First, the register r1 is allocated to the variable a1. Accordingly, the compiler apparatus 10 compiles the instruction to assign a value to the variable a, and creates a load instruction to read the value from the memory to the register r1.

Note that the LOAD instruction shown in FIG. 16 indicates an instruction to read a value to a first operand from a second operand. In addition, [ . . . ] is an address operator, and indicates an operation to read data from the address indicated by . . . on the memory.

Moreover, the compiler apparatus 10 compiles the instruction to refer to the variable a1, and creates the instruction to refer to the register r1. This instruction is, for instance, an instruction to read a value from an address on the memory by using the content of the register r1 as the address.

On the other hand, the variable a2 is determined to be spilled. Accordingly, the spill generator 660 transforms the assignment instruction to assign the variable value to the variable a2 from the variable a1 into a STORE instruction to store, in an area [memA] on the memory, the value of the register r2 storing the variable value therein. Note that the STORE instruction shown in FIG. 16 indicates an instruction to write a value from the first operand to an area indicated by the second operand.

This area is one reserved in advance to store the value of the variable a. If this variable is a local variable of a method or a function, this area may be reserved in the stack. In other words, the compiler apparatus 10 may create an instruction to reserve such an area at the heading part of each method or each function.

Next, the variables b1 to b4 have the register r2 allocated thereto. For this reason, the compiler apparatus 10 compiles the instruction to assign a value to the variable b1, and creates, for example, the LOAD instruction to read the value from the memory to the register r2.

In addition, the second allocation section 650 replaces the instruction to refer to each of the variables b1 to b4 with the instruction to refer to the register r2. For instance, an instruction to read the value from an address on the memory by using the content of the register r2 as the address may be generated.

Consequently, the instruction to assign the variable value to the variable b2 from the variable b1 is replaced with the instruction to assign the value to the register r2 from to the register r2. From the program 60, the second optimizing unit 130 deletes such assignment instruction in which the assignment destination and the assignment source are the same. As a result, the output program 24 includes only the instructions originally referring to the variable b, and does not include the assignment instructions between the variables.

Similarly, deleted are the instruction to assign a value to the variable b3 from the variable b2; the instruction to assign the value to the variable b4 from the variable b3; the instruction to assign the value to the variable a4 from the variable a3; the instruction to assign the value to the variable c2 from the variable c1; the instruction to assign the value to the variable c3 from the variable c2; and the instruction to assign the value to the variable c4 from the variable c3.

On the other hand, the variable b5 is determined to be spilled. Accordingly, the spill generator 660 transforms the assignment instruction to assign the variable value to the variable b5 from the variable b4, into the STORE instruction to store, in an area [memB] on the memory, the value of the register r2 storing the variable value therein.

In addition, the variables c1 to c4 have the register r1 allocated thereto. For this reason, the compiler apparatus 10 compiles the instruction to assign a value to the variable c1, and creates, for example, the LOAD instruction to read the value from the memory to the register r1.

After that, the compiler apparatus 10 compiles the instruction to refer to each of the variables c1 to c4, and creates the instruction to refer to the register r1. This instruction is, for instance, an instruction to read the value from an address on the memory by using the content of the register r1 as the address.

The variable a2 is determined to be spilled, as described above. The instruction to assign the variable value to the variable a2 is compiled, and the STORE instruction is created. In this case, the spill generator 660 transforms the instruction to refer to the variable value of the variable a2 into the instruction to read the variable value from the area on the memory, to store the variable value in a register, and to refer to the value of the register. For instance, created are the LOAD instruction to read the value from the area [memA] on the memory and to store the value in the register r2, and the LOAD instruction to read the value from an address on the memory by using the content of the register r2 as the address.

Similarly, the variable b5 is determined to be spilled, as described above. The instruction to assign the variable value to the variable b5 is compiled, and the STORE instruction is created. In this case, the spill generator 660 transforms the instruction to refer to the variable value of the variable b5 into the instructions to read the variable value from the area on the memory, to store the variable value in a register, and to refer to the value of the register. For instance, created are the LOAD instruction to read the value from the area [memB] on the memory and to store the value in the register r2, and the LOAD instruction to read the value from an address on the memory by using the content of the register r2 as the address.

As described above, the variable assignment and reference are transformed into various instructions such as the LOAD and STORE instructions with respect to the register. However, in terms of a given variable determined to be spilled, the instruction to assign a value to this given variable is transformed into an instruction to store data in the memory, and the instruction to refer to the value of the given variable is transformed into an instruction to load data from the memory. The assignment instructions between multiple variables created by the program 60 are deleted on condition that the multiple variables having successive live ranges are assigned to the same register.

As described above by referring to FIGS. 1 to 16, the compiler apparatus 10 according to this embodiment temporarily splits a variable into smaller variables, and then partially merges the variables by use of a register allocation result of the first time. Then, the compiler apparatus 10 again performs the register allocation to the merged variables. This allows such appropriately-split variables to be targeted for register allocation. In this way, the compiler apparatus 10 makes achievements in reducing spilling by splitting a variable, and reducing copying between registers by merging the split variables. Consequently, the efficiency of the program can be improved as a whole.

To be more precise, the second allocation section 650 performs register allocation in accordance with the same procedure as performed by the first allocation section 630, so that the variable is appropriately split. The outline of the reason for achievement in the appropriate splitting of the variable is described below. The replacement of variables and information coalescing (these are collectively called variable coalescing) performed by each of the first allocation section 630 and the second allocation section 650 may possibly produce the following advantage and disadvantage.

[Advantage] When a variable x1 and a variable x2 are merged, the degree of a variable y having the interference relationship with each of the variables x1 and x2 is decreased by 1. As a result, a register is more likely to be allocated to the variable y.

[Disadvantage] When a variable x1 and a variable x2 are merged, the number of other variables each having the interference relationship with the merged variable x is equal to or greater than the degree of any one of the variables x1 and x2 before the merger. As a result, a register is less likely to be allocated to the variable x.

However, variables are merged on condition that the first allocation section 630 allocates the same register to these variables. When the second allocation section 650 allocates registers in accordance with the same procedure and reference as those of the first allocation section 630, the register allocated to both variables x1 and x2 before the merger is expected to be allocated to the merged variable x in many cases. Moreover, a different variable having the interference relationship with at least one of the variables x1 and x2 is expected to have the same register allocated thereto both before and after the merger.

Accordingly, even when the degree of the merged variable x is theoretically increased, the second allocation section 650 is expected to allocate the registers to the variable x and the different variable having the interference relationship with at least one of the variables x1 and x2, because the first allocation section 630 allocates the registers to the variables x1 and x2 and the different variable. In other words, in terms of the aforementioned [disadvantage], even though the degree of the merged variable x is theoretically increased, whether or not to allocate the register to the merged variable x is expected not to change between before and after the merger in many cases. On the other hand, in terms of the aforementioned [advantage], the decrease in the degree leads to an increase in the flexibility of register allocation, and thereby offers various opportunities for enhancing the efficiency.

Hereinafter, a flow of register allocation in this embodiment will be described in more detail by referring to FIGS. 17 to 20. Note that, although the process shown in FIGS. 17 to 20 is based on the register allocation procedure using the technique described in Non-patent Document 5, the register allocation procedure is not limited to this.

Figure 17:
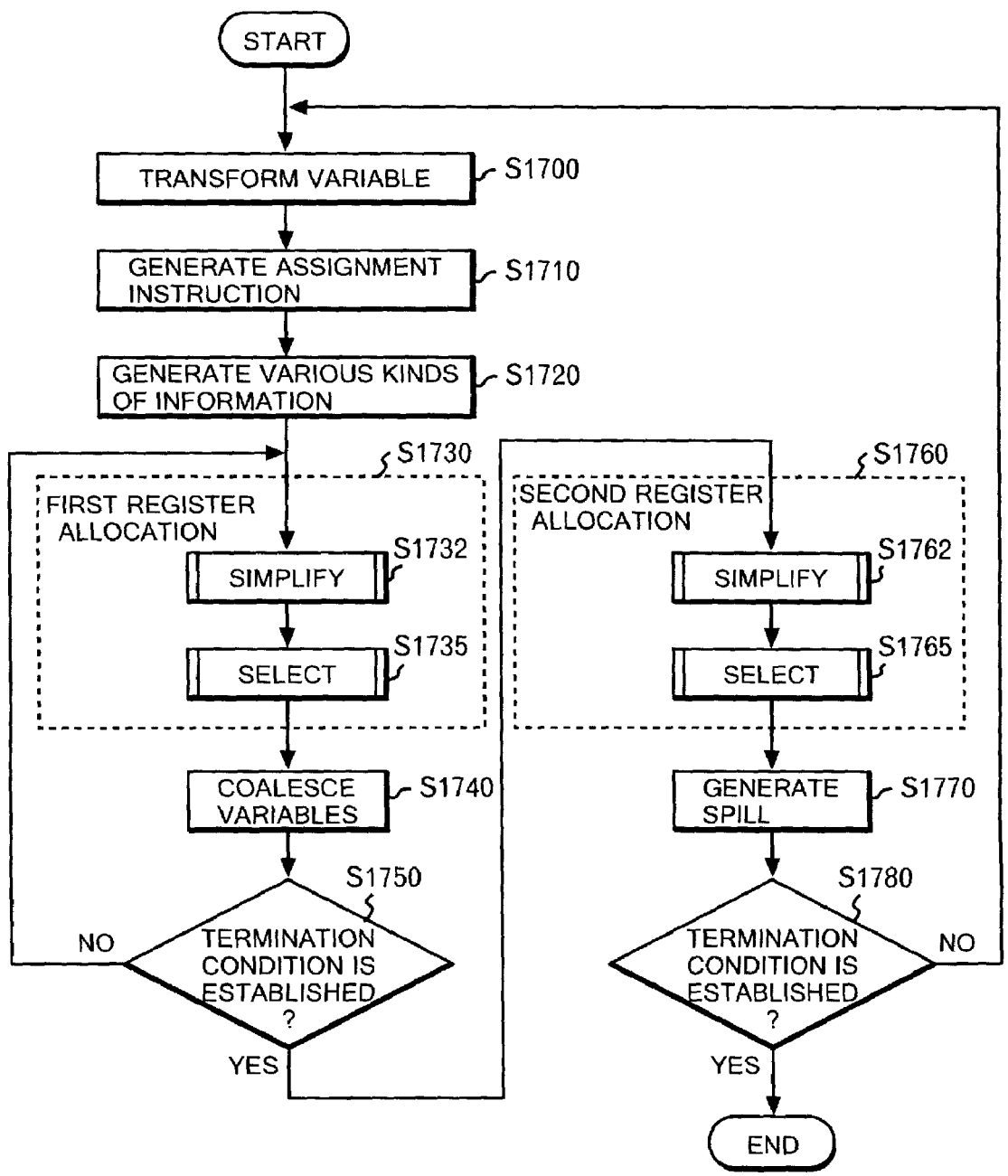
FIG. 17 shows a flow of a process of allocating registers to variables by a register allocating unit 110 according to an embodiment of the present invention.

FIG. 17 shows a flow of the process in which the register allocating unit 110 according to this embodiment allocates registers to variables. The variable transformer 600 transforms each variable in the target program 22 into multiple variables (S1700). This transformation may be completed, for example, in a way that the variable transformer 600 splits the live range of a given variable, and generates multiple variables having the values for the respective split live ranges.

In the target program 22, the assignment instruction generator 610 generates an assignment instruction to assign a value from a certain variable to another variable among the multiple transformed variables (S1710). For example, when a variable a is transformed into variables a1 and a2, the assignment instruction generator 610 generates an instruction to assign a value to the variable a2 from the variable a1. In this way, the assignment instruction generator 610 may generate an assignment instruction, for each pair of variables having successive live ranges, at the boundary of their live ranges.

The information generator 620 generates the interference information 62A, the assignment information 64A and the priorities 65A on the multiple variables used in the target program 22, and stores the generated information in the storage device 120 (S1720). Then, the first allocation section 630 selects one of a predetermined base number of physical registers and virtual registers, and allocates the selected register to each of the variables used in the program 60 in accordance with the predetermined procedure (S1730).

To be more precise, for a first variable which is a candidate for register allocation, the first allocation section 630 selects a second variable from which a value is assigned to the first variable, or a second variable to which a value is assigned from the first variable in reference to the assignment information 64A. Then, the first allocation section 630 selects the same register as that already allocated to the selected second variable, among the registers allocatable to the first variable, and allocates the same register to the first variable. The first allocation section 630 performs this allocation without allocating the same register to a set of variables having the interference relationship based on the interference information 62A.

As specific examples of the processing stages, the simplifying part 632 performs a simplifying process (S1732), and the selecting part 635 performs a selecting process (S1735). These processes will be described in detail later.

In the interference graph, the update section 640 merges multiple variables having the same register allocated thereto by the first allocation section 630, and being associated with each other in the assignment information 64A (S1740). This coalescing process is mainly carried out through the replacement of variables and the update of all the kinds of information. More precisely, the update section 640 replaces, with a new variable, the multiple variables having the same register allocated thereto by the first allocation section 630, and being associated with each other in the assignment information 64A. Here, the same register may be a virtual register. For instance, the update section 640 may rewrite the content of the program 60.

Thereafter, the update section 640 reads an interference relationship of each of the multiple variables from the interference information 62A in the storage device 120, and merges these interference relationships. For example, the update section 640 searches the interference information stored in the storage device 120 to find another certain variable having an interference relationship with at least one of the multiple variables, and changes the interference relationship to a new interference relationship between a new variable generated by merging the multiple variables, and the certain variable.

The merged interference relationships are used as an interference relationship associated with the new variable. Then, the update section 640 updates the interference information 62A by using the generated interference relationship. Moreover, the update section 640 may merge pieces of the assignment information on the multiple variables having the interference relationships to be merged, and accordingly updates the assignment information 64A in the storage device 120.

Next, the second allocation section 650 determines, as the termination condition for the first register allocation, whether or not the update section 640 has already performed the update process a predetermined times (S1750). This predetermined number of times may be an extremely small number of times, such as once. If the update process is not performed the predetermined number of times (S1750: NO), the first allocation section 630 performs the register allocation based on the program 60 having the variables replaced, the updated interference information 62B and the like. This register allocation is performed independently of the pervious allocation result, in other words, starting from the state where no register is allocated to any variable.

Instead, when the number of times of the update process is two or more times, the second allocation section 650 may determine whether or not the current register allocation result by the first allocation section 630 is the same as the previous register allocation result by the first allocation section 630. In this case, if these results are the same, the second allocation section 650 determines that the termination condition is established, and advances the process to S1760. If not, the first allocation section 630 again performs the register allocation. In this way, the first allocation section 630 and the update section 640 may iterate the respective processes in turn, that is, the first allocation section 630 performs the register allocation every time the information is updated, while the update section 640 updates the information every time the register allocation is performed. The efficiency of the program can be increased gradually through such iterations.

On condition that the termination condition is established (S1750: YES), the second allocation section 650 selects one register from among the aforementioned base number of registers, and allocates the selected register to each of variables in the program 60 using the new variable, instead of the multiple variables having the same register allocated thereto by the first allocation section 630, in accordance with the same procedure as that of the first allocation section 630 (S1760). This allocation is performed independently of the allocation result by the first allocation section 630, starting from the state where no register is allocated to any of variable. When such allocation is not possible, the second allocation section 650 determines to spill a particular variable in accordance with the predetermined reference.

To be more precise, for a first variable which is a candidate for register allocation, the second allocation section 650 selects a second variable from which a value is assigned to the first variable, or a second variable to which a value is assigned from the first variable in reference to the updated assignment information 64B. Thereafter, the second allocation section 650 selects the same register as that already allocated to the selected second variable, among the registers allocatable to the first variable, and allocates the same register to the first variable. The second allocation section 650 performs this allocation without allocating the same register to a set of variables having the interference relationships based on the interference information 62B.

As specific examples of the processing stages, the simplifying part 652 performs a simplifying process (S1762), and the selecting part 655 performs a selecting process (S1765). These processes will be described in detail later.

In the program 60, the spill generator 660 generates various kinds of instructions for spilling the first variable on condition that the second allocation section 650 determines to spill the first variable (S1770). For example, the spill generator 660 transforms the instruction to assign a variable value to the first variable into the instruction to store, in an area on the memory, the value of the register storing the variable value therein. Moreover, the spill generator 660 transforms the instruction to refer to the variable value of the first variable, into the instructions to read the variable value from the area on the memory, to store the read variable value to one of the registers, and to refer to the value of the register.

The output section 670 determines whether or not the predetermined termination condition is established (S1780). This termination condition may be a condition that the second allocation section 650 spills no variable. In other words, the live range of each variable to have the register allocated thereto is made shorter every time the process is iterated in response to the determination result. This makes it more possible to allocate the registers to all the variables. Accordingly, the registers can be allocated to all the variables in any one of the iterated processes, and accordingly, this termination condition is established. Instead of this, when the compiler apparatus 10 previously secures a register for spill, the termination condition here is always established. In other words, the process from S1700 to S1770 is executed only once. On condition that the termination condition is established (S1780: YES), the output section 670 outputs the program in which the variables have the registers thereto, and the process in FIG. 17 is terminated.

If the termination condition is not established (S1780: NO), the output section 670 returns the process to S1700. In this case, the register allocating unit 110 iterates the foregoing process while regarding the allocated register as variables.

Figure 18:
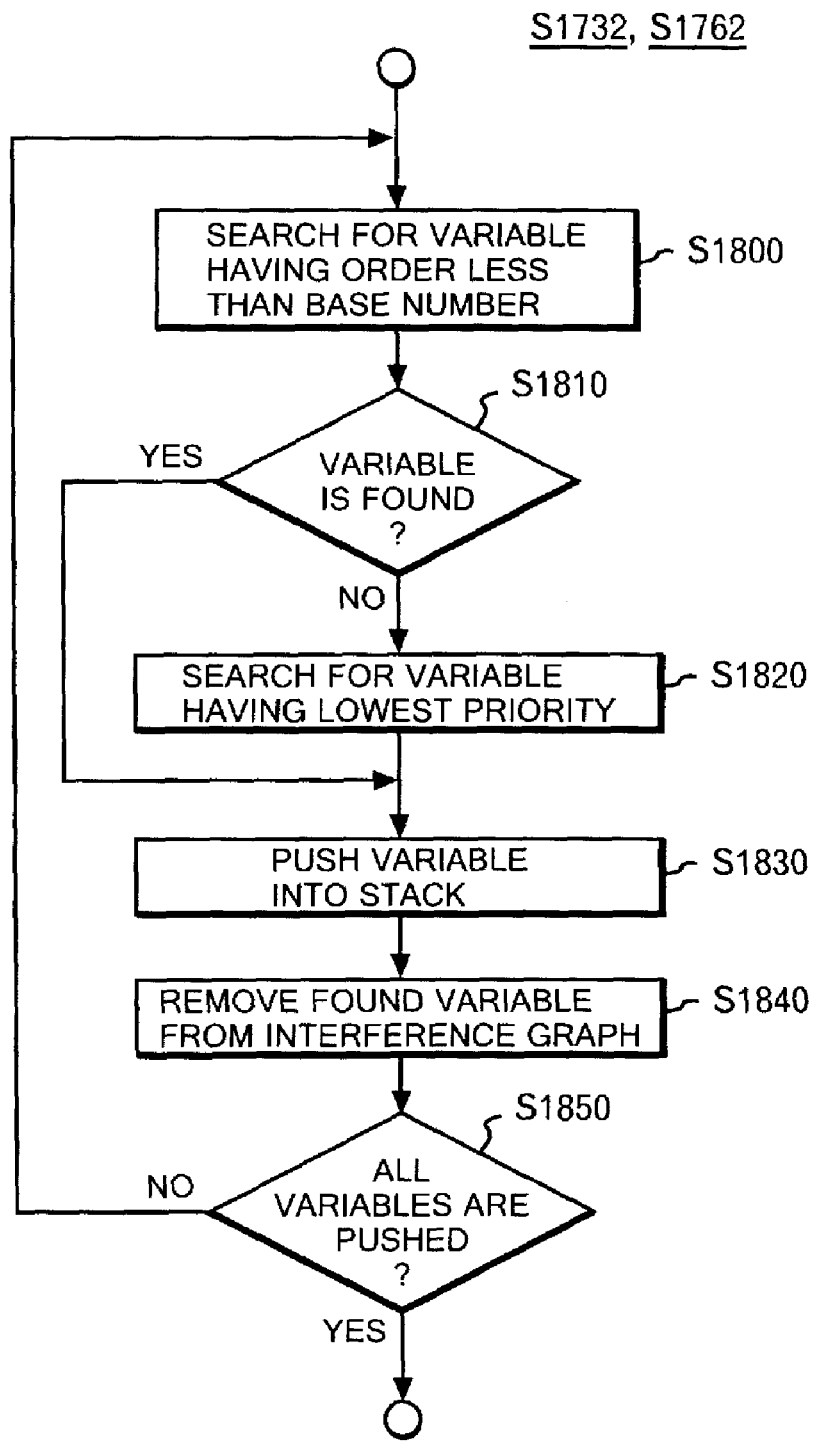
FIG. 18 shows a detailed flow of the processes in S1732 and S1762 according to an embodiment of the present invention.

FIG. 18 shows a detailed flow of the processes in S1732 and S1762. In reference to the interference information 62A, the simplifying part 632 searches out a variable having the interference relationships with a smaller number of variables than the base number that is predetermined as the upper limit number of registers usable to execute the program 60 (S1800). Then, if such a variable is not searched out (S1810: NO), the simplifying part 632 selects a variable having the lowest priority in reference to the priorities 65A (S1820).

Thereafter, the simplifying part 632 pushes the selected variable onto the stack (S1830). In addition, from the interference information 62A, the simplifying part 632 removes the interference relationships concerning the selected variable (S1840). When all the variables to have the registers allocated thereto are not pushed yet (S1850: NO), the simplifying part 632 returns the process to S1800 and iterates the aforementioned process until all the variables to have the registers allocated thereto are pushed.

Note that the process performed in S1762 by the simplifying part 652 is substantially the same as the process shown in FIG. 18 except for in that the process is based on the interference information 62B and the priorities 65B instead of the interference information 62A and the priorities 65A, respectively.

Here, pushing the variable onto the stack means that data identifying the variable is stored in a memory area having a stack-type data structure. Moreover, popping the variable from the stack means that the data identifying the variable is read from the memory area having the stack-type data structure.

Figure 19:
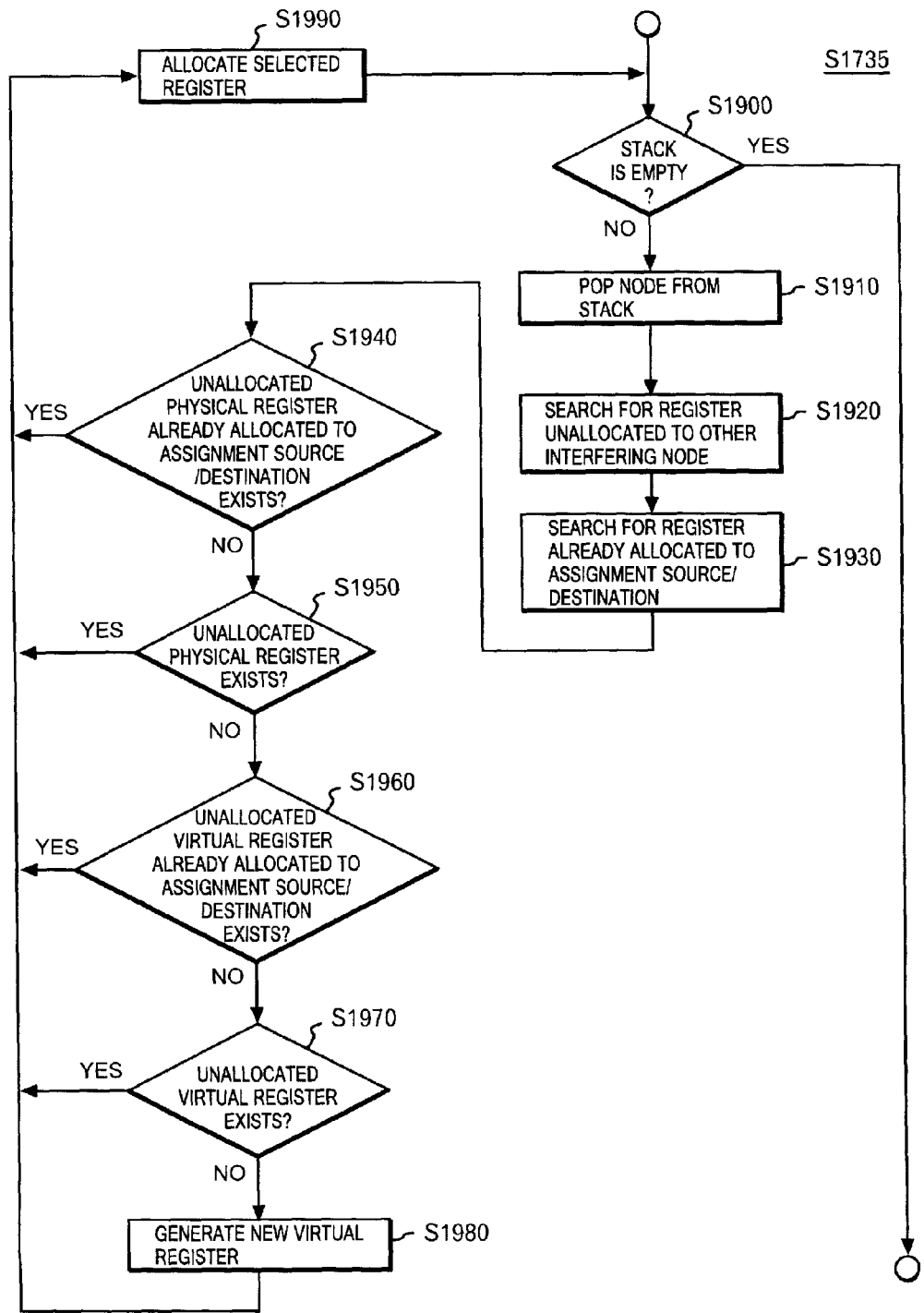
FIG. 19 shows a detailed flow of the processes in S1735 according to an embodiment of the present invention.

FIG. 19 shows a detailed flow of the process in S1735. The selecting part 635 determines whether or not the stack is empty (S1900). If the stack is not empty (S1900: NO), the selecting part 635 pops the variable from the stack (S1910). Then, the selecting part 635 searches out an unallocated register that is a physical register not yet allocated to any of the other variables having the interference relationships with the popped variable (S1920).

For instance, this can be carried out as follows. The selecting part 635 searches the interference information 62A to find all the other nodes directly connected to the node representing the popped variable in the interference graph. Then, the selecting part 635 selects a set of registers already allocated to all the other nodes thus found, in reference to, for example, the information indicating the allocation result stored in the storage device 120. Thereafter, the selecting part 635 searched out, as unallocated registers, the remaining registers after the exclusion of the selected set of registers from the predetermined base number of registers.

Next, in reference to the assignment information 64A, the selecting part 635 selects a variable from which the value is assigned to the popped variable or a variable to which the value is assigned from the popped variable (S1930). This selection is made, for example, by searching the assignment information 64A to find another variable having an assignment relationship expressed by the numerical value of 1.

Subsequently, the selecting part 635 determines whether or not there is a register already allocated to the selected variable from among the unallocated registers (S1940). If there is such a register (S1940: YES), the selecting part 635 selects the register and allocates the selected register to the popped variable (S1990).

On the other hand, if the unallocated registers include no register already allocated to the selected variable (S1940: NO), the selecting part 635 determines whether or not there is another unallocated register (S1950). If another unallocated register exists (S1950: YES), the selecting part 635 selects the register and allocates the selected register to the popped variable (S1990).

If no unallocated register exists (S1950: NO), the selecting part 635 determines whether or not there is a virtual register already allocated to another variable associated with the popped variable in the assignment information 64A (i.e., a variable to which a value is assigned from the popped variable, or a variable from which a value is assigned to the popped variable), from among the unallocated virtual registers that have not been allocated yet to the other variables having the interference relationships with the popped variable (S1960).

If there is such a virtual register (S1960: YES), the selecting part 635 selects the virtual register, and allocates the register to the popped variable (S1990). If there is not such a virtual register (S1960: NO), the selecting part 635 determines whether or not there is a virtual register not yet allocated to another variable having the interference relationship with the popped variable but already allocated to any of the other variables (S1970).

If there is such a virtual register (S1970: YES), the selecting part 635 selects the virtual register, and allocates the register to the popped variable (S1990). If there is no register that has not yet been allocated to another variable having the interference relationship with the popped variable even including the virtual registers (S1970: NO), the selecting part 635 newly generates one virtual register (S1980). The selecting part 635 allocates the generated virtual register to the popped variable (S1990). The selecting part 635 iterates the foregoing process until the stack becomes empty (S1900: YES).

Figure 20:
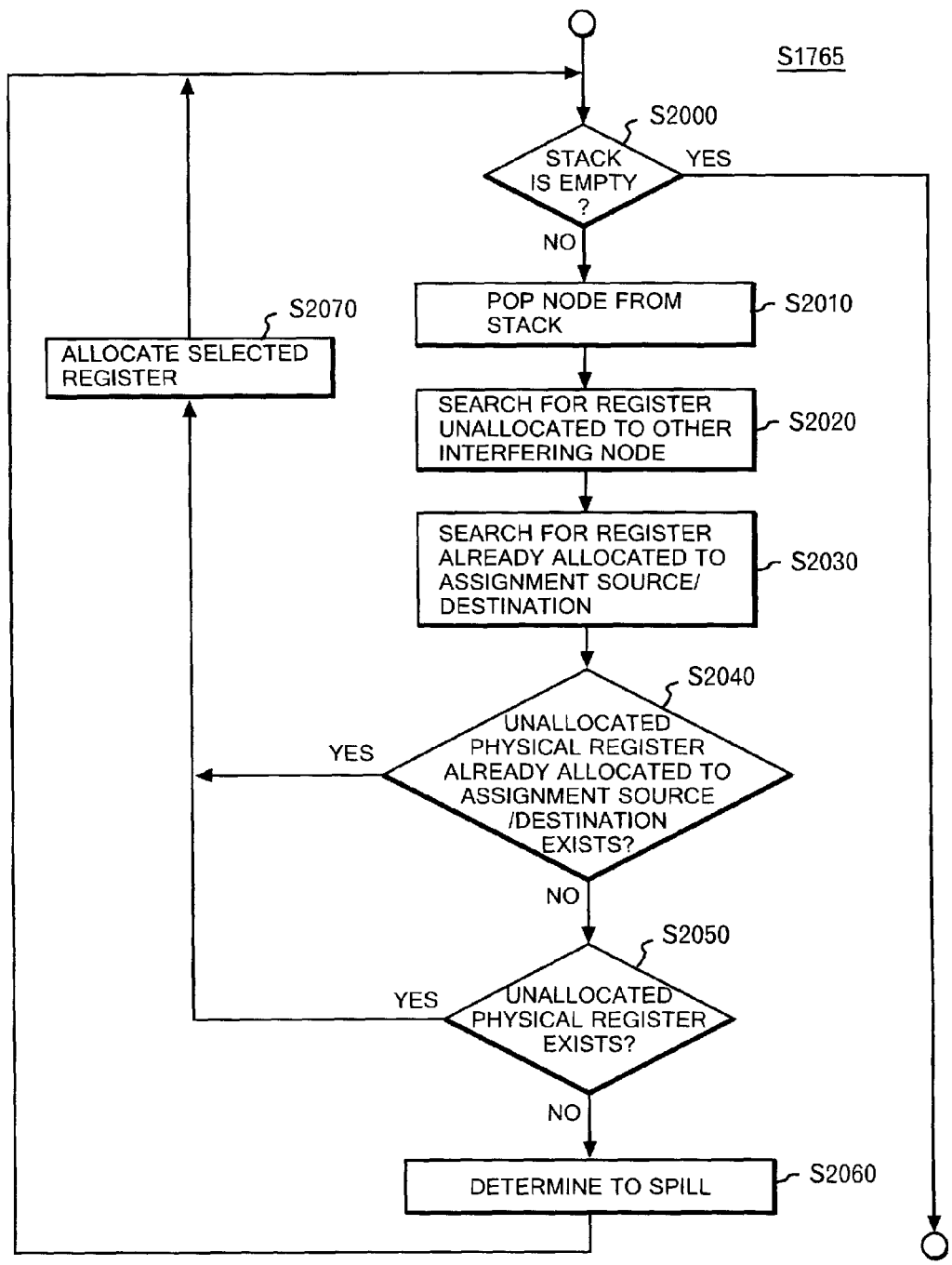
FIG. 20 shows a detailed flow of the process in S1765 according to an embodiment of the present invention.

FIG. 20 shows a detailed flow of the process in S1765. The selecting part 655 determines whether or not the stack is empty (S2000). If the stack is not empty (S2000: NO), the selecting part 655 pops a variable from the stack (S2010). Then, the selecting part 655 searches for an unallocated register that is a physical register not yet allocated to another variable having the interference relationship with the popped variable (S2020).

For example, this process is carried out as follows. The selecting part 655 searches the interference information 62B to find all the other nodes directly connected to the node representing the popped variable in the interference graph. Then, the selecting part 655 selects a set of registers already allocated to all the other nodes thus found, in reference to, for example, the information indicating the allocation result stored in the storage device 120 or the like. Thereafter, the selecting part 655 searched out, as unallocated registers, the remaining registers after the exclusion of the selected set of registers from the predetermined base number of registers.

Next, the selecting part 655 selects a variable from which a value is assigned to the popped variable or a value to which a value is assigned from the popped variable in reference to the assignment information 64B (S2030). This selection is made, for example, by searching the assignment information 64B to find another variable having an assignment relationship expressed by the numerical value of 1.

Subsequently, the selecting part 655 determines whether or not there is a register already allocated to the selected variable from among the unallocated registers (S2040). If there is such a register (S2040: YES), the selecting part 655 selects the register and allocates the selected register to the popped variable (S2070).

On the other hand, if the unallocated registers include no register already allocated to the selected variable (S2040: NO), the selecting part 655 determines whether or not there is another unallocated register (S2050). If there is another allocation register (S2050: YES), the selecting part 655 selects the register and allocates the selected register to the popped variable (S2070).

On the other hand, if any unallocated register cannot be selected (S2050: NO), the selecting part 655 determines to spill the popped variable (S2060). The selecting part 655 iterates the foregoing process until the stack becomes empty (S2000: YES).

Hereinafter, by referring to FIGS. 21 to 32, a specific example will be provided for a case where registers are allocated to variables in a different program to be complied.

Figure 21:
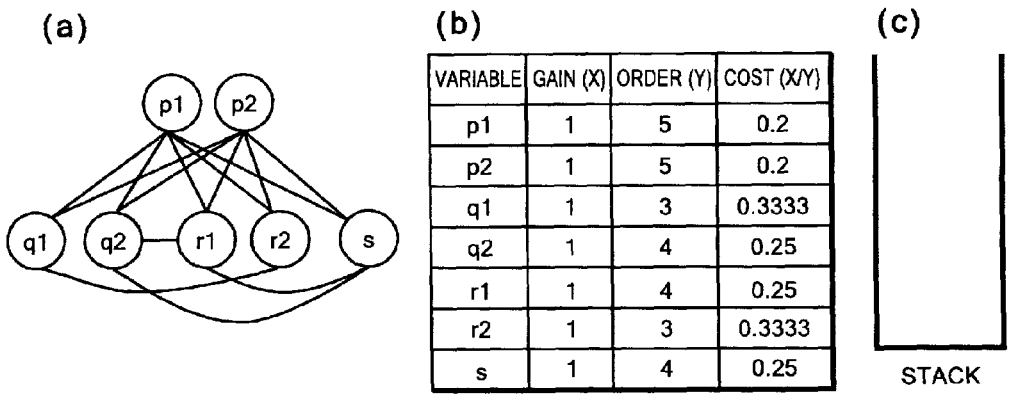
FIG. 21 shows one example of the interference relationships and the priorities of variables in another program to be complied by the compiler apparatus 10 according to an embodiment of the present invention.

FIG. 21 shows one example of the interference relationships and the priorities of variables in the different program to be complied by the compiler apparatus 10 according to this embodiment.

As shown in a part (a) in FIG. 21, the program includes variables p1 and p2, variables q1 and q2, variables r1 and r2, and a variable s as a result of variable transformation. The variable p1 has the interference relationships with the variables q1, q2, r1, r2 and s. Meanwhile, the variable p2 has the interference relationships with the variables q1, q2, r1, r2 and s. In addition, the variable q1 has the interference relationship with the variable r2, and the variable q2 has the interference relationships with the variables r1 and s.

Moreover, a set of variables having the same alphabet in the name has the assignment source-destination relationship in the assignment instruction. For example, consider an assignment instruction in which one of the variables p1 and p2 is designated as the assignment destination. In this assignment instruction, the other one of the variables p1 and p2 is designated as the assignment source. This assignment instruction may be an assignment instruction generated as a result of transforming a particular variable as in the example in FIG. 7, or may be an assignment instruction originally written in the input program.

Since each of the variables is referred to once in the program, the gain (x) of each of the variables is 1. In addition, the degrees (y) of the variables p1, p2, q1, q2, r1, r2 and s are 5, 5, 3, 4, 4, 3 and 4, respectively. Accordingly, the costs (x/y) caused by spilling the respective variables are 0.2, 0.2, 0.3333, 0.25, 0.25, 0.3333 and 0.25, respectively. Moreover, assume that the stack is empty before register allocation.

Figure 22:
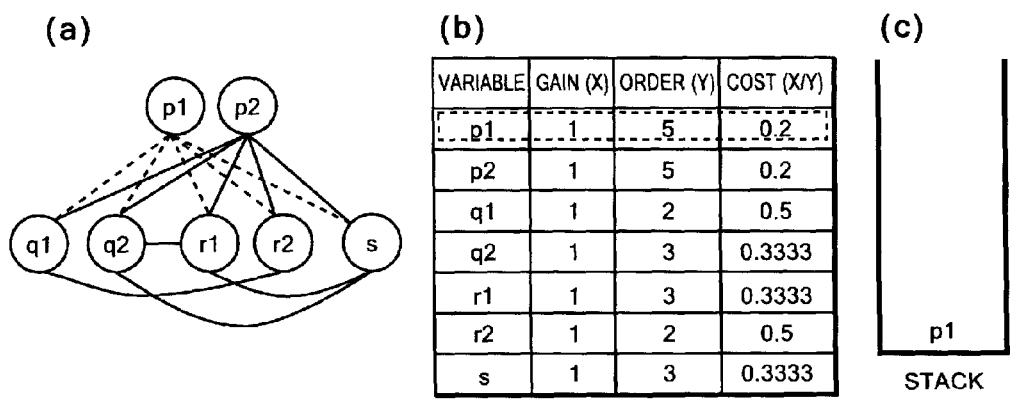
FIG. 22 shows a first step in the process of removing a certain interference relationship from the interference information through the simplify process (S1732) according to an embodiment of the present invention.

FIG. 22 shows a first step in the process of removing a certain interference relationship from the interference information through the simplify process (S1732). In this example, the upper limit number of physical registers usable to execute the program is three. In reference to the interference graph in FIG. 21, the degree of any of the variables is equal to or greater than 3. Accordingly, the simplifying part 632 selects a variable having the lowest priority for register allocation.

The lowest priority indicates that the loss caused by spill is smallest. In this example, the costs of the variables p1 and p2 are 0.2, which is smallest. Thus, the simplifying part 632 selects any one of the variables p1 and p2, for example, the variable p1, and pushes the variable p1 onto the stack.

Upon pushing the variable p1, the simplifying part 632 updates the interference information and the priorities. As a result, the degrees of the variables q1, q2, r1, r2 and s are each decreased by 1, and the decreased degrees are 2, 3, 3, 2 and 3, respectively. In addition, the costs are again calculated by using the new degrees.

Figure 23:
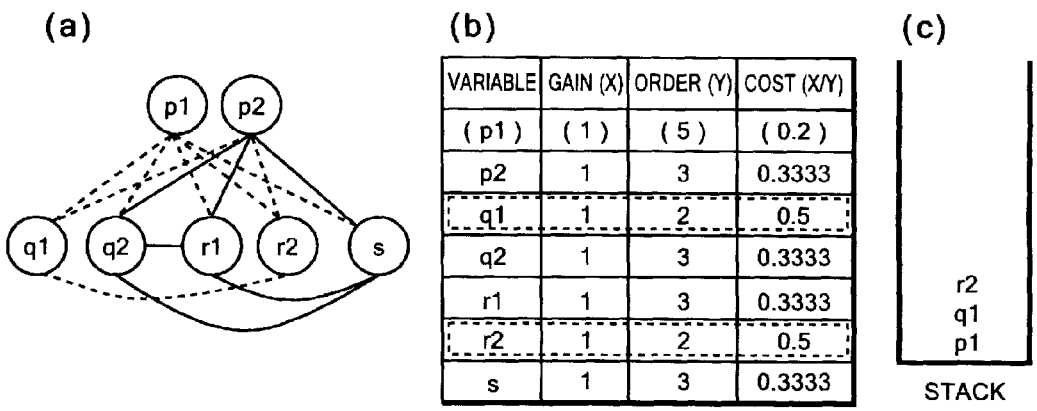
FIG. 23 shows a second step in the process of removing the next interference relationship from the interference information through the simplify process (S1732) according to an embodiment of the present invention.

FIG. 23 shows a second step in the process of removing the next interference relationship from the interference information through the simplify process (S1732). In reference to the interference graph in FIG. 22, the degrees of the variables q1 and r2 are less than 3 that is the base number. Accordingly, the simplifying part 632 selects these variables and pushes the variables to the stack. The two variables may be pushed one by one in any order. Then, the simplifying part 632 removes the interference relationships associated with these selected variables, from the interference information.

As a result, the variables p1, q1 and r2 are stored from the bottom side in the stack. Upon pushing the variables q1 and r2, the simplifying part 632 updates the interference information and the priorities. As a result, the degree of the variable p2 is decreased by 2, and becomes 3. In addition, the cost is recalculated by using this degree.

Figure 24:
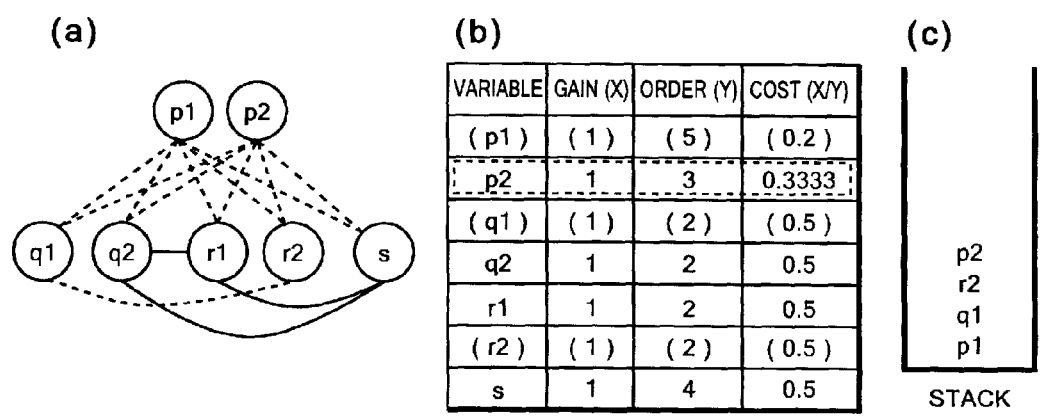
FIG. 24 shows a third step in the process of further removing the next interference relationship from the interference information through the simplify process (S1732) according to an embodiment of the present invention.

FIG. 24 shows a third step in the process of further removing the next interference relationship from the interference information through the simplify process (S1732). In reference to the graph in FIG. 23, the degree of any of the variables is equal to the base number of 3. Accordingly, the simplifying part 632 selects the variable having the lowest priority for register allocation.

In this example, all the variables have the equal costs. In this case, the simplifying part 632 may arbitrarily select and push any of the variables. Instead of this, the simplifying part 632 may select a variable from which the value is assigned to the already-pushed variable or a variable to which the value is assigned from the already-pushed variable. For example, the variable p2 is selected and pushed.

As a result, the variables p1, q1, r2 and p2 are stored from the bottom side in the stack. Upon pushing the variable p2, the simplifying part 632 updates the interference information and the priorities. Consequently, the degree of each of the variables q2, r1 and s is decreased by 1 and becomes 2. Thereafter, the costs are recalculated by using these degrees.

Figure 25:
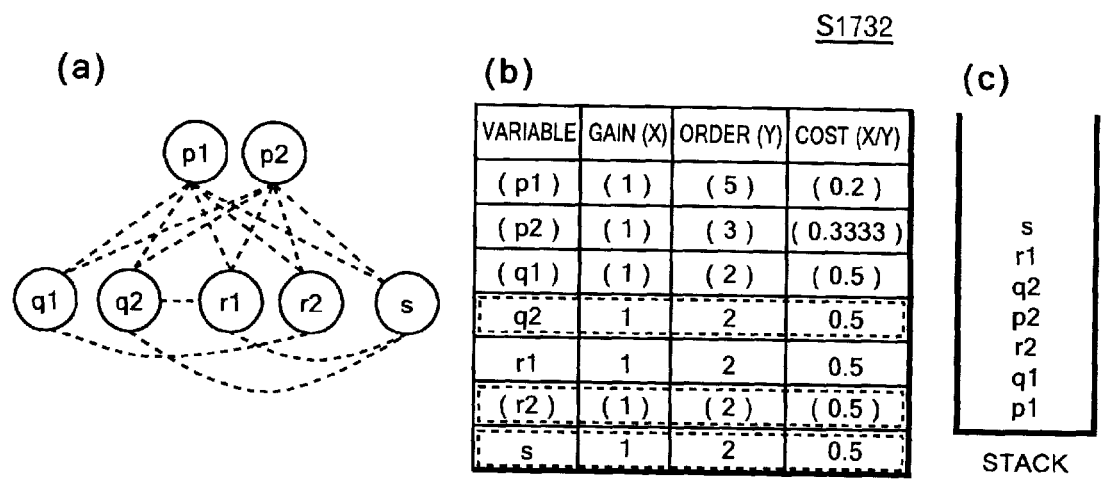
FIG. 25 shows a fourth step in the process of further removing the next interference relationship from the interference information through the simplify process (S1732) according to an embodiment of the present invention.

FIG. 25 shows a fourth step in the process of further removing the next interference relationship from the interference information through the simplify process (S1732). In reference to the graph in FIG. 24, the degree of any of the variables is less than the base number of 3. Accordingly, the simplifying part 632 selects these variables in any order and pushes the variables onto the stack. Thereby, the variables p1, q1, r2, p2, q2, r1 and s are stored from the bottom side in the stack.

Figure 26:
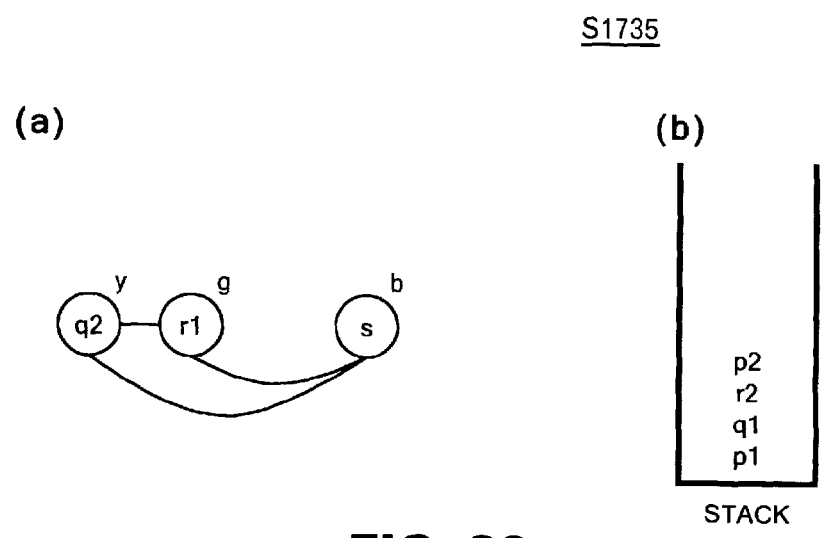
FIG. 26 shows a first step in the process of allocating the registers to the variables through the selecting process (S1735) according to an embodiment of the present invention.

FIG. 26 shows a first step in the process of allocating the registers to the variables through the selecting process (S1735). The selecting part 635 sequentially pops the variables from the stack while reconstructing the graph, and allocates the registers to the popped variables. The allocation is performed under the condition that the same register is not allocated to a set of variables having the interference relationships. In addition, this allocation can be replaced with a problem of coloring each node in the interference graph, without giving the same color to a set of nodes directly connected to each other with an edge, where each register is expressed by a color.

To be more precise, upon popping the variable s in the first place, the selecting part 635 colors the node representing the variable s in any color because all the interference relationships are removed from the interference graph. Then, upon popping the variable r1, the selecting part 635 adds the interference relationship between the variable r1 and the already-popped variable s to the interference information.

Subsequently, according to the added interference relationship, the selecting part 635 colors the variable r1 in a color different from the color already given to the variable s having the interference relationship with the variable r1. Thereafter, upon popping the variable q2, the selecting part 635 adds the interference relationships between the variable q2 and the already-popped variables r1 and s to the interference information. The selecting part 635 colors the variable q2 in a color different from the colors given to the variables r1 and s having the interference relationships with the variable q2.

As a result, the variables q2, r1 and s are colored in "yellow", "green" and "blue" indicating a first register, a second register and a third register, respectively. The variables q2, r1 and s are removed from the stack.

Here, in order to carry out such process actually, the following point is desired to be noted in terms of handling the interference information. First, after original interference relationships are once removed from an original interference graph, an interference graph is reconstructed as the original interference graph according to the original interference relationships. Accordingly, once the original interference graph itself is deleted, the original interference graph can no longer be reconstructed.

For this reason, before the simplify process, it is desirable that the simplifying part 632 generate a working interference graph by copying the original interference graph, and store the working interference graph in the storage device 120. Then, the simplifying part 632 updates the working interference graph to gradually remove the interference relationships from the interference graph. Then, the selecting part 635 reconstructs the working interference graph by determining the interference relationships between the variables in reference to the original interference graph instead of the working interference graph. In this way, the original interference graph can be appropriately reconstructed.

Figure 27:
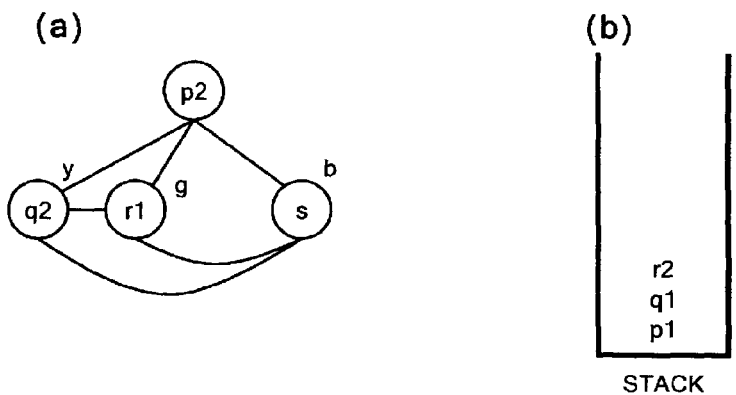
FIG. 27 shows a second step in the process of allocating the registers to the variables through the selecting process (S1735) according to an embodiment of the present invention.

FIG. 27 shows a second step in the process of allocating the registers to the variables through the select process (S1735). Subsequently, the selecting part 635 pops the variable p2 from the stack. The selecting part 635 reconstructs the interference relationships between the variable p2 and the already-popped variables q2, r1 and s.

Then, the selecting part 635 searches for a color different from the colors given to the other variables having the interference relationships with the variable p2 in order to color the node representing the popped variable p2. However, the other variables having the interference relationships with the variable p2 have been already colored in the base number of colors. For this reason, the selecting part 635 allocates a virtual register to the variable p2. Here, this virtual register is expressed with *. As a result, the variables p1, q1 and r2 remain in the stack.

Figure 28:
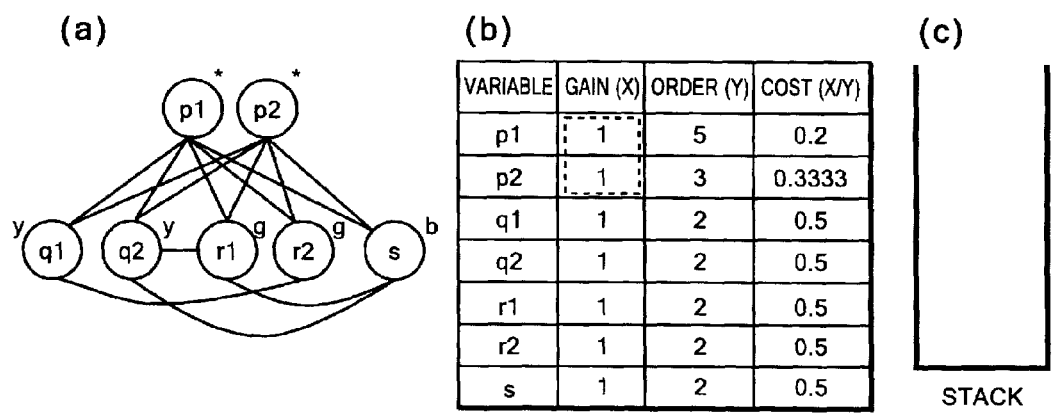
FIG. 28 shows a third step in the process of allocating the registers to the variables through the selecting process (S1735) according to an embodiment of the present invention.

FIG. 28 shows a third step in the process of allocating the registers to the variables through the selecting process (S1735). Through the same process as described above, the selecting part 635 pops the variables r2 and q1 in turn. Consequently, the nodes representing the variables r2 and q1 are colored "green" and "yellow", respectively.

However, the selecting part 635 cannot color, in the color indicating any of the physical registers, the node representing the variable p1 which is popped in the last place. For this reason, the selecting part 635 colors the node representing the variable p1, for example, in the color indicating the virtual register.

Here, in the case where this coloring result is directly used as the register allocation result, the variables p1 and p2 are to be spilled. In this case, the gain obtained by allocating the registers to the variables p1 and p2, that is, the gain of 2 obtaining by adding the gain of 1 to the gain of 1 cannot be obtained. More precisely, an instruction to load the value from the memory is executed for each instruction to refer to the value of the variable p1 and an instruction to load the value from the memory is executed for each instruction to refer to the value of the variable p2.

Hereinbelow, a specific example will be given of the process of reducing such a loss by merging the nodes according to the allocation result.

Figure 29:
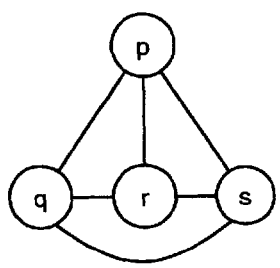
FIG. 29 shows one example of the process of merging the interference information and priorities of variables through the variable coalescing (S1740) according to an embodiment of the present invention.
Figure 29:

FIG. 29 shows one example of the process of merging the interference information and priorities of variables through the variable coalescing (S1740).

The update section 640 replaces multiple variables with a new variable. Here, the multiple variables have the same register allocated thereto by the first allocation section 630, and are associated with each other in the assignment information 64A. In reference to FIG. 28, the variables q1 and q2 have the same register allocated thereto, the variables r1 and r2 have the same register allocated thereto, and the variables p1 and p2 have the same virtual register allocated thereto.

Accordingly, the update section 640 replaces the variables p1 and p2 with a new variable p. Moreover, the update section 640 replaces the variables q1 and q2 with a new variable q. In addition, the update section 640 replaces the variables r1 and r2 with a new variable r.

FIGS. 29A and 29B show various kinds of information resulting from these replacements. The variable p has the interference relationships with the variables q, r and s. The variable q has the interference relationships with the variables r and s. The variable r has the interference relationship with the variable s. The numbers of references to the variables p, q, r and s are 2, 2, 2 and 1, respectively. Accordingly, the gains of the variables are 2, 2, 2 and 1, respectively. In addition, the variables p, q, r and s have the degrees and costs shown in FIG. 29B.

Figure 30:
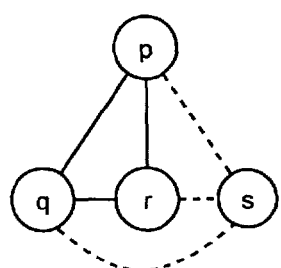
FIG. 30 shows a first step in the process of removing interference relationships from the interference information through the simplify process (S1762) according to an embodiment of the present invention.
Figure 30:
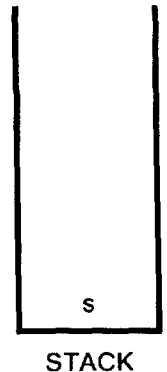

FIG. 30 shows a first step in the process of removing interference relationships from the interference information through the simplify process (S1762). In reference to FIG. 29, there is no variable having the degree less than the base number of 3. Accordingly, the simplifying part 652 selects the variable s having the lowest priority, and pushes the variable s onto the stack. As a result, the degrees of the variables p, q and r are decreased from 3 to 2. In addition, the variable s is stored in the stack.

Figure 31:
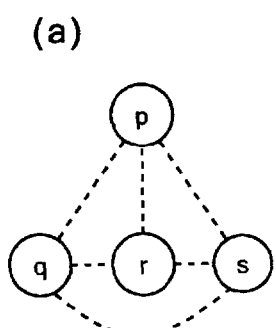
FIG. 31 shows a second step in the process of removing the interference relationships from the interference information through the simplify process (S1762) according to an embodiment of the present invention.
Figure 31:
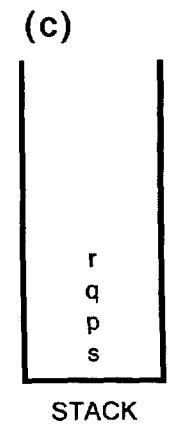

FIG. 31 shows a second step in the process of removing the interference relationships from the interference information through the simplify process (S1762). In reference to FIG. 30, the degree of each of the variables p, q and r is 2, which is less than the base number of 3. Accordingly, the simplifying part 652 pushes the variables p, q and r onto the stack. Here, the variables p, q and r can be pushed in any order. Consequently, all the variables are stored in the stack.

Figure 32:
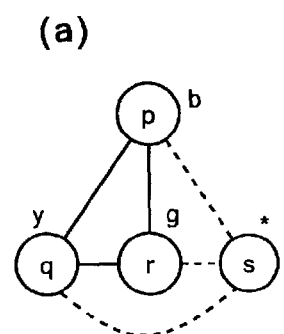
FIG. 32 shows one example of the process of allocating the registers to the variables through the selecting process (S1765) according to an embodiment of the present invention.
Figure 32:
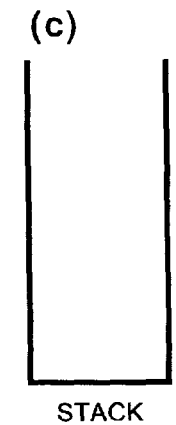

FIG. 32 shows one example of the process of allocating the registers to the variables through the selecting process (S1765). The selecting part 655 pops the variables r, q and p one by one while reconfiguring the interference graph. Then, the selecting part 655 allocates to the popped variables a register different from that allocated to the already-popped variables having the interference relationships with the currently-popped variable. Consequently, for example, the variables p, r and q are colored "blue", "green" and "yellow", respectively, and the variable s is determined to be spilled.

Here, in comparison with the case where only the first allocation section 630 allocates the registers to the variables in FIG. 28, the variable s is spilled instead of the variables p1 and p2 in this example in FIG. 32. The total gain of the variables p1 and p2 is 2 while the gain of the variable s is 1. In this way, the lost gain is decreased by 1 through the register allocation by the update section 640, in addition to the register allocation by the first allocation section 630. Specifically, for example, the number of executions of the process of reading the value of a variable from the memory to the register is decreased by 1.

Figure 33:
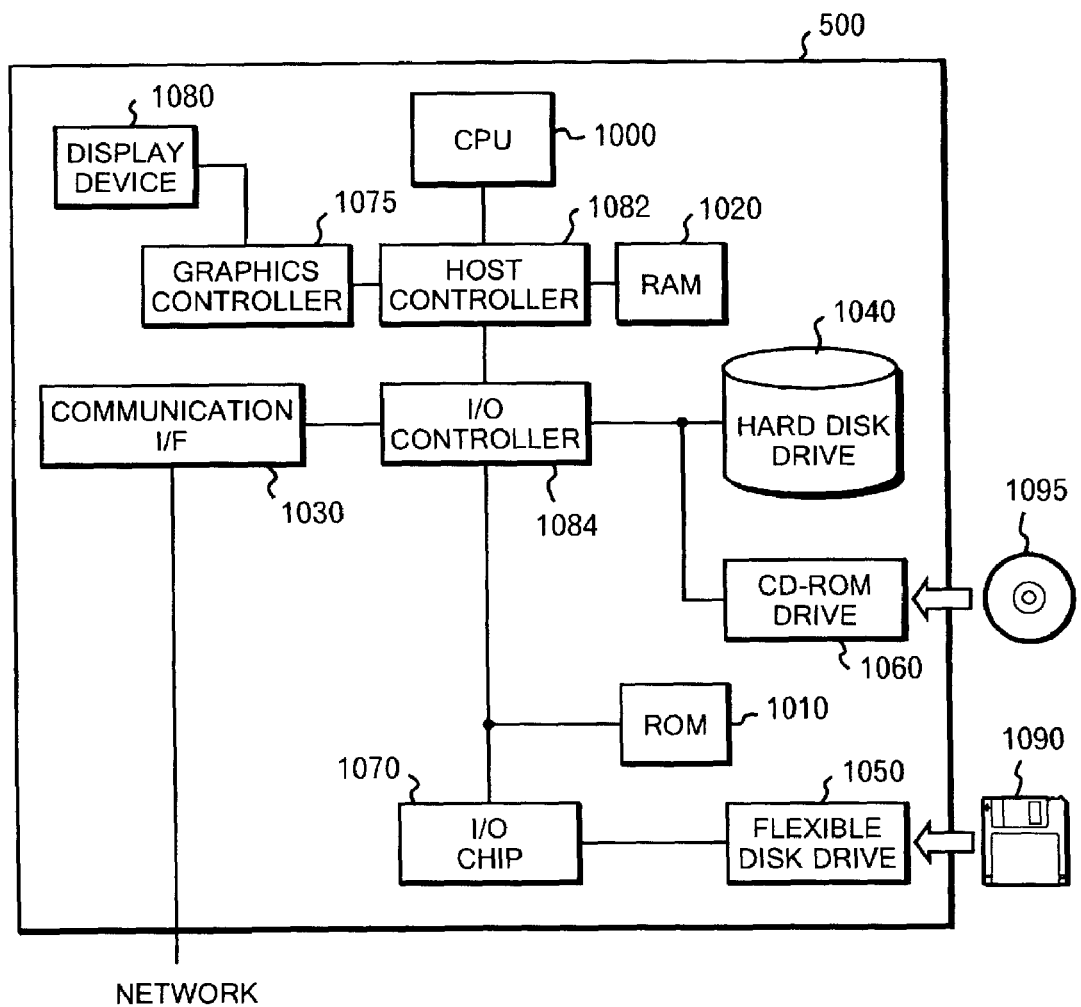
FIG. 33 shows one example of a hardware configuration functioning as the compiler apparatus 10 according to an embodiment of the present invention.

FIG. 33 is a hardware configuration of an information processing apparatus 500 functioning as the complier apparatus 10 according to this embodiment. The information processing apparatus 500 includes a CPU peripheral unit, an input/output unit and a legacy input/output unit. The CPU peripheral unit includes a CPU 1000, a RAM 1020 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a BIOS 1010, a flexible disk drive 1050 and an input/output chip 1070, all of which are connected to the input/output controller 1084.

The host controller 1082 connects the RAM 1020 to the CPU 1000 and the graphics controller 1075, each of which accesses the RAM 1020 at a high transfer rate. The CPU 1000 operates in accordance with programs stored in the BIOS 1010 and in the RAM 1020, and controls each of the components. The graphics controller 1075 obtains image data that the CPU 1000 or the like generates in a frame buffer provided in the RAM 1020, and causes the obtained image data to be displayed on a display device 1080. Instead of this, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 communicates with an external device via a network. In the hard disk drive 1040, programs and data used by the information processing apparatus 500 are stored. The CD-ROM drive 1060 reads a program or data from a CD-ROM 1095, and provides the read-out program or data to the RAM 1020 or the hard disk 1040.

Moreover, the input/output controller 1084 is connected to relatively low-speed input/output devices such as the BIOS 1010, the flexible disk drive 1050 and the input/output chip 1070. In the BIOS 1010, stored are programs such as a boot program executed by the CPU 1000 at a start-up time of the information processing apparatus 500 and a program depending on hardware of the information processing apparatus 500. The flexible disk drive 1050 reads a program or data from a flexible disk 1090, and provides the read-out program or data to the RAM 1020 or the hard disk drive 1040, via the input/output chip 1070. The input/output chip 1070 is connected to the flexible disk drive 1050 and various kinds of input/output devices, for example, through a parallel port, a serial port, a keyboard port, a mouse port and the like.

A program to be provided to the information processing apparatus 500 is provided by a user with the program stored in a storage medium such as the flexible disk 1090, the CD- ROM 1095 or an IC card. The program is read from the storage medium via the input/output chip 1070 and/or the input/output controller 1084, and is installed and executed on the information processing apparatus 500. An operation that the program causes the information processing apparatus 500 or the like to execute, is identical to the operation of the complier apparatus 10 described by referring to FIGS. 1 to 32. Accordingly, the description thereof is omitted here.

The program described above may be stored in an external storage medium. In addition to the flexible disk 1090 and the CD-ROM 1095, any one of the following media may be used as the storage medium: an optical storing medium such as a DVD and a PD; a magneto-optic storing medium such as an MD; a tape medium; and a semiconductor memory such as an IC card. Alternatively, the program may be provided to the information processing apparatus 500 via a network, by using, as a storage medium, a storage device such as a hard disk and a RAM, provided in a server system connected to a private communication network or to the internet.

As has been described by referring to FIGS. 1 to 33, the compiler apparatus 10 according to this embodiment merges variables having the same register allocated thereto as a result of the first register allocation and having the assignment source-destination relationship, and performs the second register allocation based on the interference relationships after the merger of the variables. Moreover, the second register allocation is performed in accordance with the same procedure as in the first register allocation. In this case, the register allocation result of the second register allocation after the merger is very likely to be the same as that before the merger. By use of this fact, the disadvantage caused by the merger is mitigated while the degree of each variable is decreased by the merger, thereby enhancing the flexibility in the register allocation. Consequently, the execution efficiency of the program can be improved by reducing an additional increase of processes needed for spill, for example, as shown in FIGS. 21 to 32.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A compiling method for causing a computer to allocate registers to variables used in a program to be compiled, wherein said computer includes a storage device that stores interference information indicating whether or not a certain variable and another variable used in said program have an interference relationship in which these variables concurrently hold effective values at any time point during execution of the program, and assignment information in which a variable of an assignment source of an assignment instruction in said program is associated with a variable of an assignment destination of said assignment instruction, said method comprising:

a first allocating step of selecting a each variable used in said program, in accordance with a predetermined procedure and allocating the variable to a respective register of a predetermined base number of registers, without allocating any two of a set of variables having said interference relationship to the same register of the predetermined base number of registers;

a step of replacing a plurality of aforementioned variables with a new variable on condition that said plurality of variables have same said register allocated thereto in said first allocating step and are associated with each other in said assignment information, reading from said memory device said interference relationship concerning each of said plurality of variables, merging said read interference relationships to generate an interference relationship concerning said new variable, and updating said interference information according to said generated interference relationship;

a second allocating step of selecting each variable used in said program using said new variable and said plurality of variables minus the replaced variables, in accordance with predetermined procedure as that in said first allocating step and allocating the variable to a respective register of a predetermined base number of registers, without allocating any two of a set of variables having said interference relationship based on said updated interference information to the same register of the predetermined base number of registers;

storing in memory at least one of the variables used in said program based upon a cost of storing said at least one variable determined by dividing the frequency of use of the variable in the program by the number of interference relationships of the at least one variable; and a step of outputting said program having said registers allocated to said variables in said second allocating step.

2. A compiler apparatus configured to allocate registers to variables used in a program to be compiled, comprising:

a storage device configured to store interference information indicating whether or not a certain variable and another variable used in said program have an interference relationship in which said variables concurrently hold effective values at any time point during an execution of said program, and assignment information in which a variable of an assignment source of an assignment instruction in said program is associated with a variable of an assignment destination of said assignment instruction;

a first allocation section configured to select each variable used in said program, in accordance with a predetermined procedure and to allocate the variable to a respective register of a predetermined base number of registers, without allocating any two of a set of variables having said interference relationship to the same register of the predetermined base number of registers;

an update section that is configured to reduce the number of said variables by replacing at least two of said variables with a new variable on condition that said replaced variables have the same said register allocated thereto by said first allocation section and are associated with each other in said assignment information, to read from a memory device said interference relationship concerning each of said plurality of variables, to merge said read interference relationships to generate an new interference relationship concerning said new variable, and to update said interference information according to said generated new interference relationship;

a second allocation section that is configured to select each variable used in said program using said new variable and said plurality of variables minus the replaced variables, in accordance with said procedure of said first allocation section and to allocate the variable to a respective register of a predetermined base number of registers, without allocating to any two of a set of variables having said interference relationship based on said updated interference information to the same register of the predetermined base number of registers;

a spill generator configured to select at least one of said plurality of variables and to generate instructions to store the selected variable in memory based upon a cost of storage determined by dividing the frequency of use of the variable in the program by the number of interference relationships of the at least one variable; and an output section that is configured to output said program having said registers allocated to each said variable used by said second allocation section.

3. The compiler apparatus according to claim 2, wherein:

said predetermined base number is a number predetermined as an upper limit number of physical registers, each of which is a register usable to execute the program;

said first allocation section is configured to select a register from among a group of registers including said base number of said physical registers and additionally including at least one virtual register unusable to execute said program, and to allocate said selected register to each said variable, in accordance with said predetermined procedure;

and said second allocation section is configured to select a register from among a number of said physical registers as said base number, and to allocate said selected register to each of said variables in said program in which said new variable is used, in accordance with said predetermined procedure.

4. The compiler apparatus according to claim 3, wherein:

for a first variable that is a candidate for register allocation, said first allocation section is configured to select a second variable to which a value is to be assigned from said first variable, or said second variable from which a value is to be assigned to said first variable, in reference to said assignment information, and to allocate, to said first variable, said register as already allocated to said selected second variable, from among said registers allocatable to said first variable, without allocating said register to a set of variables having said interference relationship based on said interference information before said update;

said update section is configured further to merge said assignment information concerning said plurality of variables having said merged interference relationships, and thereby to update said assignment information in said storage device; and for a first variable that is a candidate for register allocation, the second allocation section is configured to select a second variable to which a value is to be assigned from said first variable, or a second variable from which said value is to be assigned to said first variable, in reference to said assignment information, and to allocate, to said first variable, said same register as that already allocated to said selected second variable, from among said registers allocatable to said first variable, without allocating said same register to a set of variables having said interference relationship based on said interference information after said update.

5. The compiler apparatus according to claim 4, wherein:

said storage device stores a priority of each variable according to which register is allocated to said variable, and includes a memory area for building a stack;

said first allocation section includes a simplifying part that is configured to iterate a process until all said variables to have said registers allocated thereto are pushed by searching for a variable having said interference relationships with a smaller number of variables than said base number, in reference to said interference information, selecting a searched-out variable if said variable is searched out, or selecting a variable having the lowest priority if said variable is not searched out, pushing said selected variable onto said stack, and removing said interference relationship concerning said selected variable from said interference information;

a selecting part that is configured to iterate a process until said stack becomes empty, by popping a variable from said stack, selecting in reference to said assignment information a variable to which said value is to be assigned from said popped variable, or a variable from which said value is to be assigned to said popped variable, selecting a register already allocated to said selected variable, if any, from among unallocated registers each of which is a physical register not yet allocated to another variable having said interference relationship with said popped variable, selecting another one of said unallocated registers if said register already allocated to said selected variable is not included in said unallocated registers, selecting a virtual register already allocated to the selected variable, if any, from among unallocated virtual registers each of which is a virtual register not yet allocated to another variable having said interference relationship with said popped variable when there is no unallocated physical register, allocating said register to the popped value on condition that one of the same said registers including said virtual register is allocated to said plurality of variables and that said plurality of variables are associated with each other in said assignment information, wherein said update section is configured to search for another variable having said interference relationship with at least any one of said plurality of variables, in reference to said interference information stored in said storage device, and to change said interference relationship between said searched-out variable and said plurality of variables, to said interference relationship between said searched-out variable and said new variable with which said plurality of variables are replaced;

said second allocation section includes a simplifying part that is configured to iterate a process until all said variables to have said registers allocated thereto are pushed, by searching for a variable having said interference relationships with a smaller number of variables than said base number, in reference to said interference information having said interference relationships merged, selecting a searched-out variable if said variable is searched out, or selecting a variable having the lowest priority if said variable is not searched out, pushing said selected variable onto said stack, removing said interference relationship concerning said selected variable from said interference information;

a selecting part that is configured to iterate a process until said stack becomes empty, by popping a variable from said stack, selecting in reference to said assignment information, a variable to which said value is to be assigned from said popped variable, or a variable from which said value is to be assigned to said popped variable, selecting a register already allocated to said selected variable, if any, from among unallocated registers each of which is a physical register not yet allocated to another variable having said interference relationship with said popped variable, or selecting another one of said unallocated registers if said register already allocated to said selected variable is not included in said unallocated registers, allocating said register to said popped value; and determining to spill said popped variable if any unallocated register cannot be selected; and said output section configured to output said compiled program including an instruction to read a value of a variable determined to be spilled from a memory every time said variable is used, and an instruction to write a value of a variable from a register to said memory every time said variable value is defined.

6. The compiler apparatus according to claim 5, wherein:

said selecting part in said first allocation section is configured to allocate an available virtual register to said popped variable when said unallocated virtual registers which are virtual register not yet allocated to other variables each having said interference relationship with said popped variable do not include a virtual register already allocated to any one of said variables associated with said popped variable in said assignment information, but includes an available virtual register already allocated to another variable; and said selecting part is configured to newly generate said virtual register, and allocated said generated virtual register to said popped variable, when there is no register, including said virtual register, not yet allocated to another variable having said interference relationship with said popped variable.

7. The compiler apparatus according to claim 4, further comprising:

a variable transformer that is configured to split a live range of a certain variable and generate a plurality of variables respectively holding values of said plurality of variables for said split live ranges, to transform said certain variable into said plurality of variables;

an assignment instruction generator that is configured to generate in the program an instruction to assign a value from a certain variable in the plurality of variables thus transformed, to another variable; and an information generator that is configured to generate, as said interference information, information indicating interference relationships concerning a plurality of variables used in said program including said plurality of variables, to transform and store said generated information in said storage device, as well as generate assignment information indicating a pair of variables used as an assignment source and an assignment destination in said generated assignment instruction, and to store said generated assignment information in said storage device;

said first allocation section is configured to allocate said registers to said variables on the basis of said interference information and said assignment information stored in said storage device; and said update section is configured to update said interference information stored in said storage device, in reference to said assignment information stored in said storage device.

8. The compiler apparatus according to claim 4, wherein the spill generator is configured to transform an instruction to refer to said variable value of said first variable into an instruction to read said variable value from an area on said memory, store said variable value in said register, refer to said value of said register, and transform an instruction to assign a variable value to a certain first variable into an instruction to store, in an area on a memory, a value of said register storing said variable value, on condition that said second allocation section determines to spill a certain first variable, wherein said first allocation section is configured to regard as a variable a register generated by said spill generator and said second allocation section, and further is configured to allocate said register to each variable.

9. The compiler apparatus according to claim 2, wherein said storage device is configured to store, as said interference information, an interference graph in which each variable used by said program is expressed as a node, and in which a pair of nodes representing a pair of variables having said interference relationship there between are connected to each other with an edge;

said first allocation section and said second allocation section each is configured to determine registers to be allocated to variables by setting different colors for respective registers, and coloring nodes in different colors without coloring in a same color, a pair of nodes directly connected to each other with said edge; and said update section is configured to replace a plurality of nodes representing said plurality of variables in said interference graph with a single new node, and to replace an edge between each of said plurality of nodes and a corresponding one of other nodes in said interference graph, with an edge between said single new node and one of said other corresponding nodes, for a plurality of variables having same register allocated thereto by said first allocation section and being associated with each other in said assignment information.

10. The compiler apparatus according to claim 2, wherein said first allocation section is configured to perform a process of selecting each said register from among a base number of or more registers and allocating said selected register to each variable used in said program in accordance with said predetermined procedure, without allocating said selected register to a set of variables having said interference relationship based on said interference information updated by said update section every time said update section updates said interference information;

wherein said update section is configured to read interference relationships each concerning one of a plurality of variables having said selected register allocated thereto and being associated with each other in said assignment information from said storage device, generating an interference relationship concerning a new variable with which said plurality of variables are replaced, by merging said read interference relationships and updating said interference information according to said generated interference relationship every time said first allocation section allocates said registers; and wherein said second allocation section is configured to allocate said registers to said variables based of said updated interference information on condition that said update section performs said update process a predetermined number of times.

11. The compiler apparatus according to claim 2, wherein, for a first variable that is a candidate for register allocation, said first allocation section is configured to select, in reference to said assignment information, a second variable to which a value is to be assigned from said first variable and to allocate to said first variable said register as that already allocated to said selected second variable from among said registers allocatable to said first variable without allocating same said register to a set of variables having said interference relationship based on said interference information before the update;

wherein said update section further is configured to merge said assignment information concerning said plurality of variables having said interference relationships merged, and to update said assignment information in said storage device;

wherein, for a first variable that is a candidate for register allocation, said second allocation section is configured to select a second variable to which a value is to be assigned from said first variable, in reference to said assignment information and to allocate to said first variable same said register as already allocated to said selected second variable from among said registers allocatable to said first variable without allocating same said register to a set of variables having said interference relationship based on said interference information after said update.

12. The compiler apparatus according to claim 2, wherein, for a first variable that is a candidate for register allocation, said first allocation section is configured to select, in reference to said assignment information, a second variable from which a value is to be assigned to said first variable and allocates to said first variable said register as that already allocated to said selected second variable from among said registers allocatable to said first variable without allocating same said register to a set of variables having said interference relationship based on said interference information before the update, wherein said update section further is configured to merge said assignment information concerning said plurality of variables having said interference relationships merged, and to update said assignment information in said storage device;

wherein, for a first variable that is a candidate for register allocation, said second allocation section is configured to select a second variable from which the value is to be assigned to the first variable, in reference to said assignment information and allocates to said first variable same said register as already allocated to said selected second variable from among said registers allocatable to said first variable without allocating same said register to a set of variables having said interference relationship based on said interference information after said update.

13. A computer program product comprising a non-transitory computer useable medium including a computer readable program, wherein said computer readable program when executed on a computer causes said computer to perform the method steps for a compiling method for causing a computer to allocate registers to variables used in a program to be compiled, wherein said computer includes a storage device that stores interference information indicating whether or not a certain variable and another variable used in said program have an interference relationship in which these variables concurrently hold effective values at any time point during execution of the program, and assignment information in which a variable of an assignment source of an assignment instruction in said program is associated with a variable of an assignment destination of said assignment instruction, the method comprising the steps of:

a first allocating step of selecting each variable used in said program, in accordance with a predetermined procedure and allocating the variable to a respective register of a predetermined base number of registers, without allocating any two of a set of variables having said interference relationship to the same register of the predetermined base number of registers;

a step of replacing a plurality of aforementioned variables with a new variable on condition that said plurality of variables have same said register allocated thereto in said first allocating step and are associated with each other in said assignment information, reading from said memory device said interference relationship concerning each of said plurality of variables, merging said read interference relationships to generate an interference relationship concerning said new variable, and updating said interference information according to said generated interference relationship;

a second allocating step of selecting each variable used in said program using said new variable instead of said plurality of variables, in accordance with same said predetermined procedure as that in said first allocating step and allocating the variable to a respective register of a predetermined base number of registers, without allocating any two of a set of variables having said interference relationship based on said updated interference information to the same register of the predetermined base number of registers; and a step of storing in memory at least one of the variables used in said program based upon a cost of storing said at least one variable determined by dividing the frequency of use of the variable in the program by the number of interference relationships of the at least one variable;

a step of outputting said program having said registers allocated to said variables in said second allocating step.

* * * * *